(12) United States Patent
Tanabe et al.

(10) Patent No.: US 7,953,831 B2
(45) Date of Patent: May 31, 2011

(54) METHOD FOR SETTING UP FAILURE RECOVERY ENVIRONMENT

(75) Inventors: Yuichiro Tanabe, Yokohama (JP);
Yoshifumi Takamoto, Kokubunji (JP);
Keisuke Hatasaki, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 469 days.

(21) Appl. No.: 12/043,580

(22) Filed: Mar. 6, 2008

(65) Prior Publication Data

US 2009/0150528 A1 Jun. 11, 2009

(30) Foreign Application Priority Data

Dec. 6, 2007 (JP) ................................. 2007-315343

(51) Int. Cl.
*G06F 15/16* (2006.01)
(52) U.S. Cl. ........ 709/221; 709/201; 709/203; 709/220; 709/222; 709/223
(58) Field of Classification Search .................. 709/201, 709/203, 221, 220, 222, 223
See application file for complete search history.

(56) References Cited

U.S. PATENT DOCUMENTS

| | | | |
|---|---|---|---|
| 6,324,656 B1 * | 11/2001 | Gleichauf et al. | 714/37 |
| 6,389,459 B1 * | 5/2002 | McDowell | 709/216 |
| 2006/0143498 A1 | 6/2006 | Hatasaki et al. | |
| 2007/0174691 A1 * | 7/2007 | D'Souza et al. | 714/13 |
| 2007/0294337 A1 * | 12/2007 | Gaos et al. | 709/203 |
| 2009/0138541 A1 * | 5/2009 | Wing et al. | 709/201 |
| 2010/0017184 A1 * | 1/2010 | Vijayan Retnamma et al. | 703/13 |

FOREIGN PATENT DOCUMENTS

JP 2006-163963 6/2006

* cited by examiner

*Primary Examiner* — Djenane M Bayard
(74) *Attorney, Agent, or Firm* — Brundidge & Stanger, P.C.

(57) ABSTRACT

A method for configuring failover environment, wherein the data on the configuration of the standby server device is obtained by transferring a program for obtaining configuration data to the standby server device; comparison is made in the configuration management table in the management server between the configuration of the standby server device and that of the working server device; and the working server device is started up by emulating the configuration lacking in the working server device by using the unit for emulating the server configuration when the configuration of the standby server device and that of the working server device are different from each other.

20 Claims, 27 Drawing Sheets

FIG. 11

104 CONFIGURATION MANAGEMENT TABLE

| 1101 SERVER IDENTIFIER | 1102 POWER SOURCE STATUS | 1103 OPERATIONAL STATUS OF I/O VIRTUALIZATION UNIT | 1104 I/O | | 1107 ALLOCATED DISK | 1108 INSTALLED DRIVER | 1109 SERVER OPERATION STATUS |
|---|---|---|---|---|---|---|---|
| | | | 1105 TYPE | 1106 EMULATION | | | |
| HOST1 | ON | OFF | HBA1 | – | LU1 | Driver1 | NORMAL |
| | | | NIC | – | – | – | |
| HOST2 | ON | ON | HBA1 | – | LU2 | Driver1 Driver3 | NORMAL |
| | | | HBA1 | – | LU3 | | |
| | | | HBA3 | O | – | – | |
| | | | NIC | – | – | – | |
| HOST3 | OFF | OFF | HBA1 | – | LU4 | Driver1 Driver2 | NORMAL |
| | | | HBA2 | – | LU5 | | |
| | | | NIC | – | – | – | |
| HOST4 | OFF | OFF | HBA1 | – | LU6 | Driver1 Driver2 | NORMAL |
| | | | HBA2 | – | LU7 | | |
| | | | NIC | – | – | – | |
| HOST5 | OFF | OFF | HBA1 | – | – | – | NORMAL |
| | | | HBA3 | – | – | | |
| | | | NIC | – | – | – | |
| HOST6 | OFF | OFF | HBA3 | – | – | – | NORMAL |
| | | | HBA4 | – | – | | |
| | | | NIC | – | – | – | |

FIG. 12

105 I/O DEVICE MANAGEMENT TABLE

| I/O DEVICE DATA (1201) | | |
|---|---|---|
| I/F FOR I/O DEVICE (1202) | TYPE OF I/O DEVICE (1203) | FIRMWARE VERSION (1204) |
| I/F A | HBA1 | 01-00 |
| | HBA2 | 01-00 |
| I/F B | HBA3 | 01-00 |
| I/F C | HBA4 | 01-00 |
| | | 02-00 |
| I/F D | HBA5 | 01-00 |
| | HBA6 | 01-00 |
| | | 02-00 |
| | HBA7 | 01-00 |
| | | 02-00 |
| | | 03-00 |

FIG. 13

106 I/F MANAGEMENT TABLE

| I/F FOR I/O DEVICE (1301) | I/F DRIVER (1302) |
|---|---|
| I/F A | Driver A |
| I/F B | Driver B |
| I/F C | Driver C |
| I/F D | Driver D |

FIG. 14

107 SERVER SWITCHOVER MANAGEMENT TABLE

| SERVER IDENTIFIER (1401) | SERVER TO REPLACE FAILED SERVER (1402) | STATUS OF FAILOVER ENVIRONMENT SETTING (1403) |
|---|---|---|
| HOST 1 | HOST 5 | ALREADY SET |
| HOST 2 | HOST 5 | UNDER SETTING |
| HOST 3 | HOST 5 | NO SETING |
| HOST 4 | HOST 6 | NO SETING |
| HOST 5 | NONE | – |
| HOST 6 | NONE | – |

METHOD FOR SETTING UP FAILURE RECOVERY ENVIRONMENT

INCORPORATION BY REFERENCE

The present application claims priority from Japanese application JP2007-315343 filed on Dec. 6, 2007, the content of which is hereby incorporated by reference into this application.

BACKGROUND OF THE INVENTION

This invention relates to a method for facilitating a system configuration in a computer having failover mechanism.

Server devices usually have interfaces for providing connections with plural external devices. Examples of such external devices include storage devices, network devices, etc. HBAs (host bus adapters) for providing connections with storage devices and NICs (network interface cards) for providing connections with networks, are examples of such interfaces. Those interfaces are usually provided with dedicated driver programs corresponding to the makers or the types, of the interfaces.

A driver program, hereafter referred to simply as a driver, is installed in an operating system (OS) which runs on a server device and establishes connections with external devices such as disk devices or networks in the process of initiating the OS performed in the stage of starting up the server device. After the establishment of the connections with the external devices has been completed by the driver, the OS accepts the input/output commands from an application program. The application program can exchange the input/output signals with the external devices through the transfer of the commands to the desired drivers.

A method for performing a failover operation has already been in the public domain, as disclosed in JP-A-2006-163963, wherein working server devices and standby server devices are provided in preparation for server failures and when a failure occurs in any of the working server devices, the failed working server device is taken over by one of the standby server devices. In that method, the same disk device is shared between a working server device and a standby server device, and when a failure occurs in the working server device, the ongoing computing operation is continued by causing the standby server device to take over the boot disk in the disk device in which the OS running on the working server device was installed.

According to that method, the interface for the working server device and the interface for the standby server device are connected with the same external device in preparation for the switchover in case of a failure. While the working server device is operating, the standby server device is in the standby state with power supply being cut off. When the standby server device is turned on in accordance with the switchover from the working server device to the standby server device in response to a failure occurring in the working server device, the interface for the standby server device is initialized as a result of the initialization of the above mentioned OS so that connection with the external device can be established. Thus, the switchover from the working server device to the standby server device is completed.

In order to configure a system for performing such a failover operation as described above, it is usually necessary to make the working server device and the standby server device identical in hardware configuration with each other. The hardware configuration mentioned here includes, for example, the capacities of memories, the types and number of processors, etc. Such equivalence in hardware configuration is required to maintain the same operating performance before and after the switchover.

In addition, it is also necessary to provide the working server device and the standby server device with the same type interfaces. Such provision is necessary to preserve the suited combination of driver and associated interface and therefore to secure connection with the same external device, before and after the switchover.

If the established suited combination of driver and interface is preserved before and after the switchover, the system under consideration can operate normally before and after the switchover. However, if the interface used for the working server device is different in configuration from that used for the standby server device, the system may sometimes malfunction after the switchover.

One of the reasons for the malfunction will be due to the use of the different types of interfaces. For example, the different types of interfaces will refer to the HBA and the NIC which are to be respectively connected with external devices having different functions. In such a case, malfunction will be caused after switchover since the standby server device can no longer be connected functionally with the external device with which the working server device was previously connected. This happens when the working server device and the standby server device are not connected with the physically same external device. Therefore, it is necessary to provide the same types of interfaces for the working server device and the standby server device.

Even though the same types of interfaces are provided for both the working server device and the standby server device, malfunction may still arise if those interfaces are manufactured by different makers so that a necessary driver needed after the switchover is not installed. Namely, since a driver adapted to the interface used after switchover is missing, the interface cannot be normally connected with the external device in the stage of OS initialization. Thus, computing operation cannot be continued due to the lack of the operating environment established before the switchover.

Further, even if the types and makers of interfaces are the same, the same adverse phenomenon may occur if there is difference in the versions of the firmware installed in the interfaces. The version of firmware is often renewed when a new function is added to the interface. In such a case, a driver corresponding to the new function must be installed in the OS so as to secure normal operations.

When a failover environment is configured, necessary drivers are previously installed in the OS so as to secure normal operations irrespective of the difference in the types of interfaces and the versions of firmware. The labor required in the installation of necessary drivers in all the working and standby server devices, however, will be complicated and time-consuming.

In a system having N working server devices and M standby server devices, when a failure occurs in any of the N working server devices, the configuration of failover environment for any of the M standby server devices to take over the operation of the failed working server device requires the acquisition of data on the configurations of the N+M server devices and the M×N repeated operations of driver installation. Therefore, the increase in the number of the drivers, i.e. N plus M, will make the initial configuration of failover environment complicated and time-consuming. There will also arise a problem of operational errors increasing.

SUMMARY OF THE INVENTION

According to this invention, a program for obtaining configuration data is transferred to and acquired by, the standby server device; the configuration data acquired by the standby server device are compared with the content of the configuration management table; if the result of comparison indicates non-coincidence in the configuration data, the configuration that a particular working server device lacks is emulated by using a means for configuration emulation so that the particular working server device is started up; and a driver adapted to the lacking configuration is then installed.

Consequently, the time required to configure a server device for performing failover operation can be shortened and such configuration itself will also be simplified.

Other objects, features and advantages of the invention will become apparent from the following description of the embodiments of the invention taken in conjunction with the accompanying drawings.

BRIEF DESCRIPTION OF THE DRAWINGS

FIG. 11 shows a configuration management table included in the management server shown in FIGS. 1 and 2;

FIG. 12 shows an I/O device management table included in the management server shown in FIGS. 1 and 2;

FIG. 13 shows an I/F management table included in the management server shown in FIGS. 1 and 2;

FIG. 14 shows a server switchover management table included in the management server shown in FIGS. 1 and 2;

DETAILED DESCRIPTION OF THE EMBODIMENTS

This invention will be described in detail below by way of embodiment with reference to the attached drawings.

Embodiment 1

Figure 1:
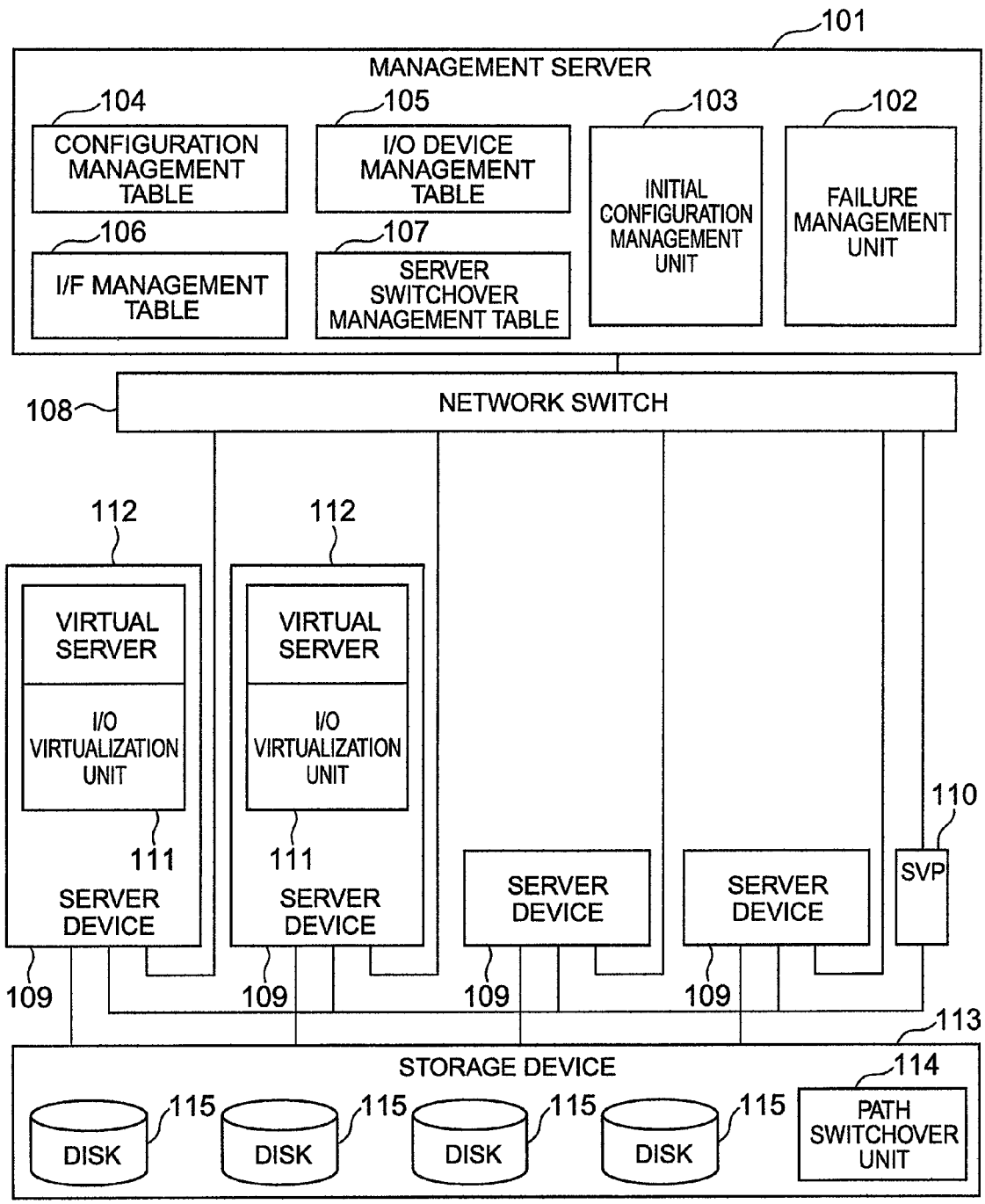
FIG. 1 schematically shows the overall configuration of a system according to this invention.

FIG. 1 schematically shows the overall configuration of a system according to this invention. A management server (management computer) 101 comprises a failure management unit 102, an initial configuration management unit 103 and various tables 104~107. The management server 101 is connected via a network switch 108 with server devices (computer devices) 109 and a service processor (SVP) 110. The SVP 110 is connected with all the server devices 109.

Each server device 109 can be constituted of an I/O virtualization unit 111 and a virtual server (virtual computer) 112. Each server device 109 is connected with a disk 115 allocated thereto by means of a path switchover unit 114 located in a storage device 113 so that the server devices 109 can access the disks 115.

The management server 101 has a function of detecting a failure occurring in each server device and then ridding the server of the failure. The I/O device management table 105 stores data on the suited combinations of I/O devices, types of I/O devices and associated firmware versions. The I/F management table 106 stores data on the suited combinations of I/O devices as I/Fs and I/F drivers. The configuration management table 104 stores data on the configurations of and the statuses of, the server devices 109. Acronyms I/F and I/O used in this specification stand for "interface" and "input/output", respectively.

The server switchover management table 107 stores substitute server devices 109 for replacing failed server devices 109, and statuses of initial setting of failover configuration. This embodiment will be shown as an example of simplifying the initial configuration for switchover set up by the management server 101 when a failure occurs in one of the server devices 109.

Figure 2:
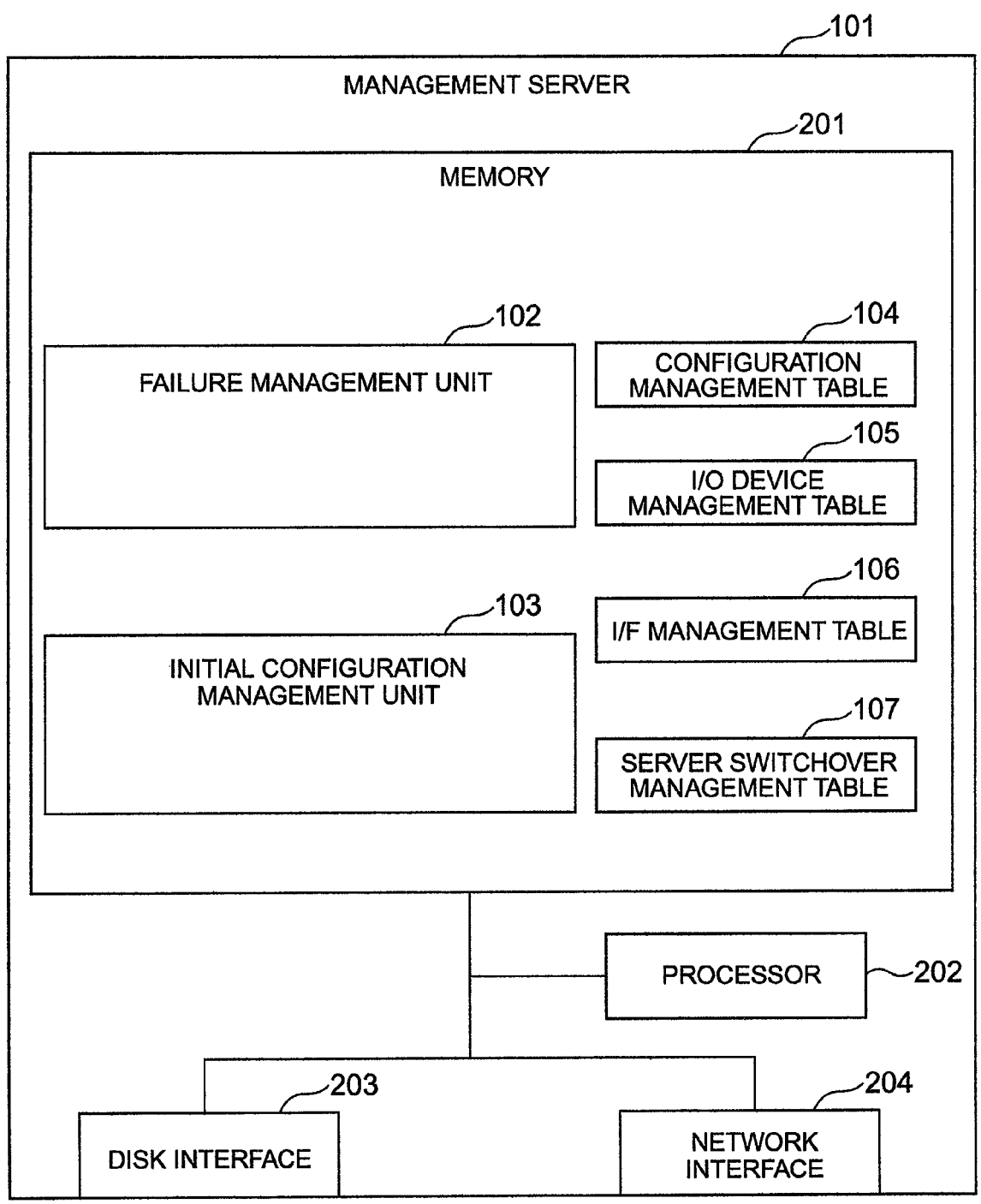
FIG. 2 schematically shows the configuration of a management server included in the system shown in FIG. 1.

FIG. 2 schematically shows an example of the configuration of the management server 101 included in the system shown in FIG. 1. The management server 101 comprises a memory 201, a processor 202, a disk interface 203 and a network interface 204.

The memory 201 includes the failure management unit 102, the initial configuration management unit 103, the configuration management table 104, the I/O device management table 105, the I/F management table 106 and the server switchover management table 107, all shown in FIG. 1. The contents of the failure management unit 102, the initial configuration management unit 103 and the tables 104~107 are read into and processed by, the processor 202. The disk interface 203 is connected with the disk in which a program for booting up the management server 101 is installed. The network interface 204 is connected with a network, and data on failures of various devices are transferred through it. The network may be a local area network (LAN), a wide area network (WAN) or any of a variety of similar networks.

The failure management unit 102 and the initial configuration management unit 103 are programs whose execution by means of the processor 202 realizes various required processes. However, the management unit 102 or the initial configuration management unit 103 can also be configured in the form of hardware with an integrated circuit on a microchip.

Figure 3:
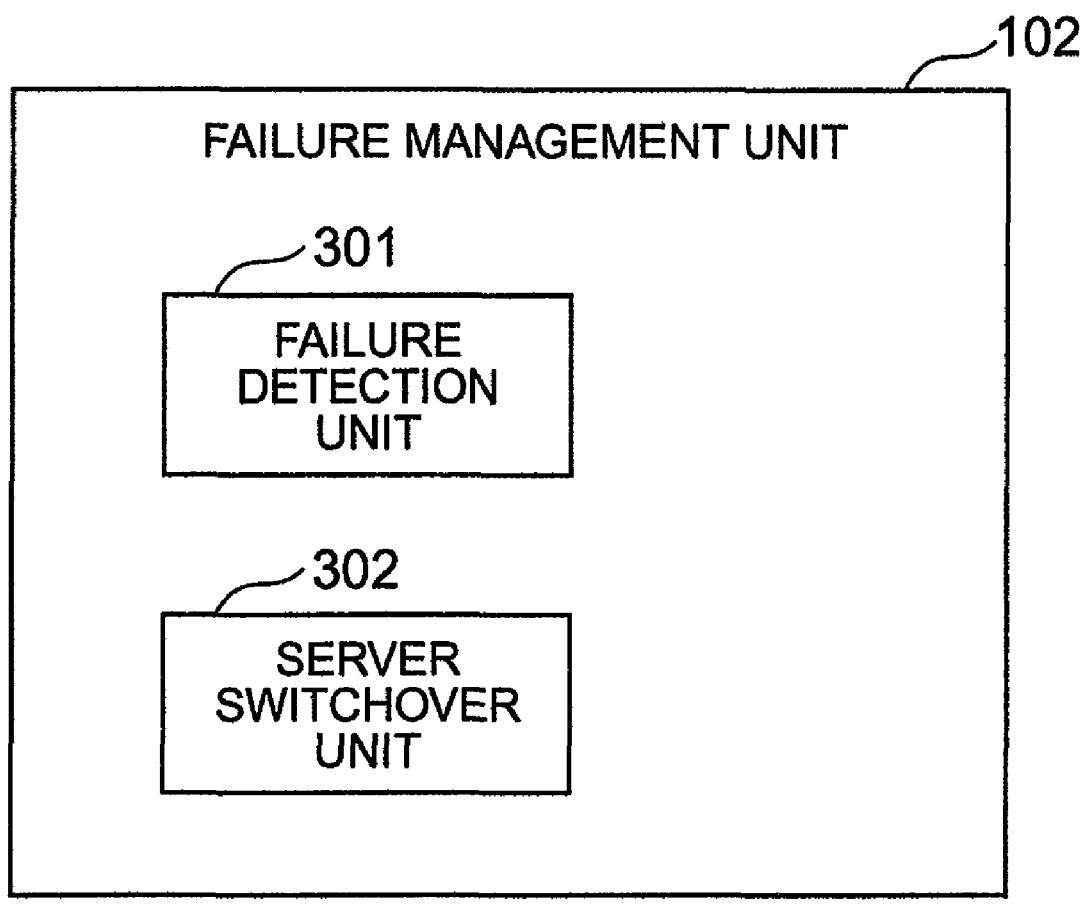
FIG. 3 schematically shows the configuration of a failure management unit included in the management server shown in FIG. 2.

FIG. 3 schematically shows an example of the configuration of the failure management unit 102 included in the management server 101 shown in FIG. 2. The failure management unit 102 consists mainly of a failure detection unit 301 and a server switchover unit 302. The failure management unit 102 has a function of detecting a failure occurring in any of the server devices 109. In this embodiment, there are plural server devices 109 whose failures are the subject of management.

The failure detection unit 301 has a function of specifying the failed server device depending on the contents of failure messages issued from plural server devices 109 and then specifying the types of the failures. The server switchover unit 302 has a function of replacing the failed server device 109 by a substitute server device 109, that is, switching over from the failed server device to the substitute server device. In this embodiment, plural substitute server devices 109 can be provided for the substitution of plural failed server devices 109.

The server switchover unit 302 has a function of switching over from the specified server device 109, which is to be specified as affected by a failure among the plural server devices 109 by the failure detection unit 301, to another server device 109 provided as a substitute server device. As described in detail later, "switchover" means to switch the system start-up disk used by the failed server unit 109 and the data disk essential for the operation of the system, from the failed server device 109 to the associated substitute server device 109. As a result of this "switchover", the substitute server device 109 can continue the ongoing computing operation in place of the failed server device 109.

Figure 4:
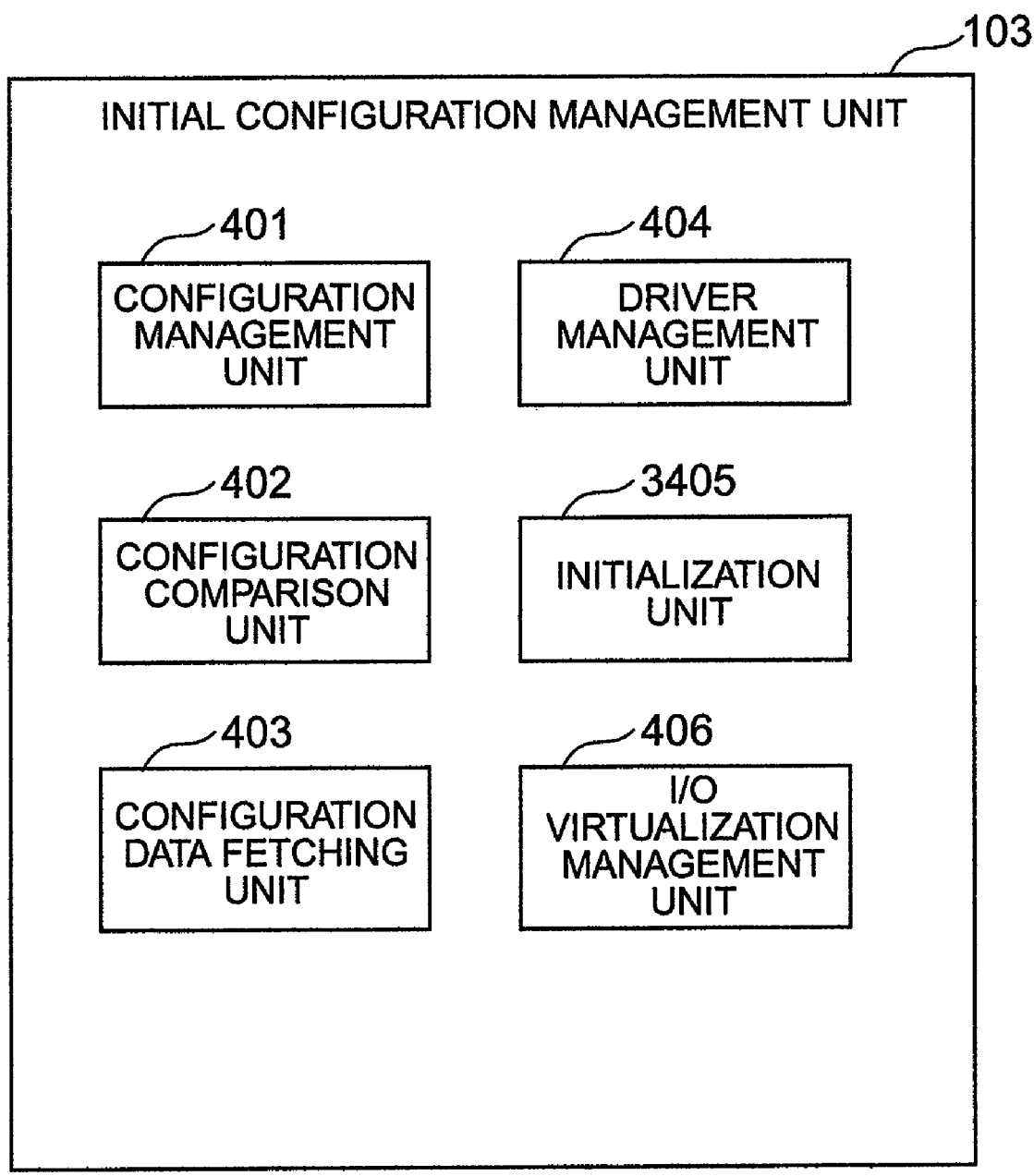
FIG. 4 schematically shows the configuration of an initial configuration management unit included in the management server shown in FIG. 2.

FIG. 4 schematically shows an example of the configuration of the initial configuration management unit 103 included in the management server 101 shown in FIG. 2. The initial configuration management unit 103 performs the preprocessing for executing the switchover of the server devices 109 in case of a failure as described with reference to FIG. 3 above. The initial configuration set up by the initial configuration management unit 103 usually takes place in the stage before the start-up of actual tasks after the server device 109 has been introduced.

In case of failures, the ongoing tasks and services can be continued by switching from the failed server device 109 to a substitute server device 109, but there is a possibility that such switchover cannot be normally completed if the configuration of the failed server device 109 is different from that of the substitute server device 109. For example, malfunction may arise after the switchover due to the difference in the types or number of the disk interfaces 203 and the network interfaces 204, or the versions of the firmware used in the interfaces. In the case where there are plural server devices 109 which are the subject of failure management and plural substitute server devices 109, it is very difficult to make the configurations of both the types of server devices coincident with each other. Therefore, the initial configuration management unit 103 serves to absorb such difference in configuration and to secure normal operation after such switchover.

The initial configuration management unit 103 comprises a configuration management unit 401, a configuration comparison unit 402, a configuration data fetching unit 403, a driver management unit 404, an initialization unit 405 and an I/O virtualization management unit 406.

The configuration management unit 401 is a main routine for configuring a server having a failover function and manages the initial configuration as a whole. The configuration comparison unit 402 serves to compare the configuration of a working server unit 601 with that of a standby server unit 602. The configuration data fetching unit 403 starts up and manages a mini-OS, and also fetches data on the configurations of the standby server units 602. The driver management unit 404 manages drivers adapted to I/O devices. The initialization unit 405 instructs the server devices 109 to initiate the initial configuration for failover. The I/O virtualization management unit 406 instructs the I/O virtualization unit 111 to emulate the I/F which a working physical server 601 has.

The failure detection unit 301, the server switchover unit 302, the configuration management unit 401, the configuration comparison unit 402, the configuration data fetching unit 403, the driver management unit 404, the initialization unit 405 and the I/O virtualization management unit 406 are all programs, and the execution of these programs by the processor 202 leads to the realization of the respective required processes. However, each of the failure detection unit 301, the server switchover unit 302, the configuration management unit 401, the configuration comparison unit 402, the configuration data fetching unit 403, the driver management unit 404, the initialization unit 405 and the I/O virtualization management unit 406 can also be configured in the form of hardware with an integrated circuit on a microchip.

To simplify the description in the following, respective processing units, which are programs, will be described as main roles in the respective processes. When the respective processing units are configured in the form of hardware, they play the main roles in the required processes.

Figure 5:
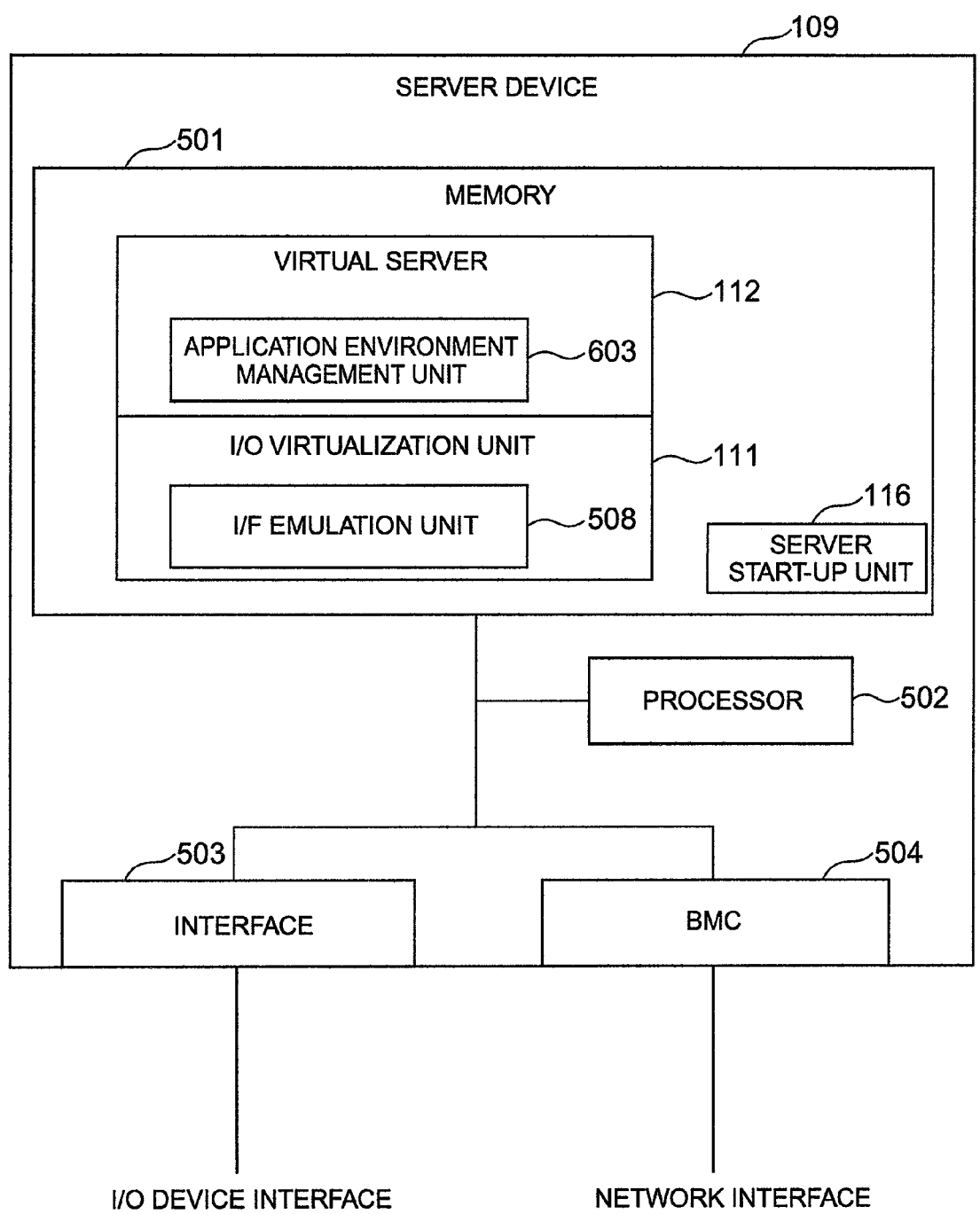
FIG. 5 schematically shows the configuration of a server device included in the system shown in FIG. 1.

FIG. 5 schematically shows am example of the configuration of the server device 109 included in the system shown in FIG. 1. The server unit 109 comprises a memory 501, a processor 502, an I/O interface 503 and a base board management controller (BMC) 504. The memory 501 stores programs which run on the server device 109, and the programs are executed by the processor 502.

The BMC 504 is connected with the SVP 110 (see service processor 110 in FIG. 1), and transfers configuration data and notifies the occurrence of failures. The BMC 504 can operate independently of the processor 502 and therefore can notify the occurrence of a failure to the SVP 110 even when the processor 502 fails and can not operate. The BMC 504 can also perform power management in accordance with external demands. Further, the BMC 504 has a function of monitoring the signals from temperature sensors and the voltage sensors installed in the server 109 to monitor abnormalities and sending out a signal indicating whether or not there is an abnormal operation, in response to external inquiries. Since the BMC 504 is energized by an auxiliary power source, not shown in FIG. 5, which is provided separate from the power source that feeds power to the server device 109, it operates continuously even when the power source for the server device 109 is in the turned-off state.

The interface 503 is connected with an I/O device interface, which is in turn coupled to a storage device 113 or a network switch 108. A single server device 109 may be provided with plural interfaces 503. Such examples include a case where a server device is connected with a storage device 113 and a network and a case where a server device has plural interfaces 503 of a configuration to secure high reliability.

A server boot unit 116 receives demands from the SVP 110 and the management server 101, fetches an OS stored in the storage device 113, and boots up the server device 109 by using the fetched OS 702. Further, the server boot unit 116 receives demands from the SVP 110 and the management server 101 and accordingly boots up the virtual server 112 and the I/O virtualization unit 111.

The BMC 504 has a function of notifying via network the failure that occurred in the hardware within the server device 109 and controlling the turn-on/off of power sources.

Since the BMC 504 can operate irrespective of the location where a failure occurs, it can send out failure notification via network even when a failure occurs in the memory 501 or the processor 502.

An I/O virtualization unit 111 and a virtual server 112 can be configured in the memory 501. An application environment management unit 603 is configured in the virtual server 112. The application environment management unit 603 means a task system required to be executed by the server device. An I/F emulation unit 508 is configured in the I/O virtualization unit 111.

The I/F emulation unit 508 can emulate interfaces that are different in firmware version, function and type from the interface 503 which the server device 109 has. Namely, the I/F emulation unit 508 can provide for the application environment management unit 603 a variety of interfaces different from the interfaces 503.

Concretely speaking, "I/F emulation" means causing the I/F emulation unit 508 to appear as if it provides different I/Fs for the application environment management unit 603 executed in the virtual server 112. As described later, the application environment management unit 603 manages the OS 702 and an application program 701 (e.g. see FIG. 7). The processing corresponding to the application environment management unit 603 is the processing corresponding to the application environment such as the OS 702 and the application program 701. The result of the emulation of I/F is installed as a driver in the OS 702. Whenever the OS 702 finds a new I/F, it attempts the installation of a driver related thereto. In order to install a driver associated with the new I/F, therefore, it is necessary to notify the OS 702 that the new I/F has been found. There are several possible procedures for such I/F emulation for attaining this purpose.

One of such procedures is to emulate the location where the I/F of interest is connected. In general, I/Fs are connected with the bus provided in a server device 109. In the management of a driver by the OS 702, the I/F itself is paired up with the location where the I/F is connected with the bus, to form management data. Consequently, it is necessary to install a new driver even when the same particular I/F is reconnected with the bus at a different location. Therefore, it is considered to emulate the location of the I/F and, if necessary, to install a new driver associated with the location. The emulation of the I/F location can be performed by allowing the I/F emulation unit 508 to send out required location data to the OS 702 in the initialization stage taking place at the time of the OS 702 being booted up.

Another procedure of emulation is to emulate an I/F whose driver is not installed in the OS 702. The OS 702 decides on whether the I/F in question has its driver installed in the OS 702, by referring to the identifier assigned to the I/F. At the time of initializing the OS 702, search is made for all the buses with which I/Fs are connected, and when the intended I/F is found, the identifier of the intended I/F is required to be sent back in the form of a predetermined protocol. At this time, the I/F emulation unit 508 can notify the OS 702 of the connection of a new I/F by sending back the identifier of the I/F to be emulated. After the emulation of the I/F, the I/O to/from the emulated I/F is exchanged with the I/O to/from the actual physical I/F.

Still another process of emulation is to emulate the functions of an I/F. In general, an I/F incorporates therein its processing configuration for performing its intended function. For example, the processing configuration is in the form of an integrated circuit. The function of the I/F, which the OS 702 requires, is to process the disk READ/WRITE demand issued from the OS 702. The processing configuration of the I/F and the OS 702 usually serves to accept demands by using the control registers incorporated in the processing configuration.

For example, the types of demands and the orders of parameters which can be handled by control registers are previously defined, and processing is performed in accordance with these predetermined entities. Accordingly, the emulation of the I/F function can be effected by previously registering in the I/F emulation unit 508 the identifier of the I/F and the behavior of the control register corresponding to the I/F issued from the OS 702 and by selecting the registered behavior of the control register when the emulation of the I/F having the registered identifier is required.

The I/O virtualization unit 111 allocates CPU times and memories to the virtual server 112. The virtual server 112 is a logic hardware device with the I/F allocated thereto which is the emulated version of the I/F viewed from the OS. Thus, both the OS on the virtual server 112 and the devices provided outside the virtual server 112 recognize the virtual server 112 as a server device having physical hardware.

In the input and output through the I/F, the I/O virtualization unit 111 is interposed between the virtual server 112 and the actual device in the server device 109, and properly converts the reciprocating input and output signals. The I/F emulation unit 508 just serves to emulate a physical device as viewed from the OS through such conversion of reciprocating input and output signals. Actually, the I/O virtualization unit 111 converts the input from the actual device in the server device 109 into the data which can be processed by the emulated I/F assigned to the virtual server 112, and the converted data are fed into the virtual server 112. Also, the I/O virtualization unit 111 converts the output from the virtual server 112 into the data which can be processed by the actual device (I/F) in the server device 109, and the converted data are fed into the actual device in the server device 109. By changing the way of conversion, the I/O virtualization unit 111 can emulate a variety of physical devices and also can allocate virtual devices emulated as a desired number of devices to the virtual server 112.

In this way, in the I/F emulation as described above, a different I/F is virtually provided for the application environment management unit 603 to be processed by the virtual server 112, and the input and output signals are subjected to the data conversion between the different I/F and the actual physical I/F.

The I/O virtualization unit 111, the virtual server 112, the application environment management unit 603, the I/F emulation unit 508 and the server boot unit 116 are all programs, and desired processes are performed by executing these programs by the processor 502. However, the I/O virtualization unit 111, the virtual server 112, the application environment management unit 603, the I/F emulation unit 508 and the server boot unit 116 can also be configured in the form of hardware with an integrated circuit on a microchip.

Figure 6:
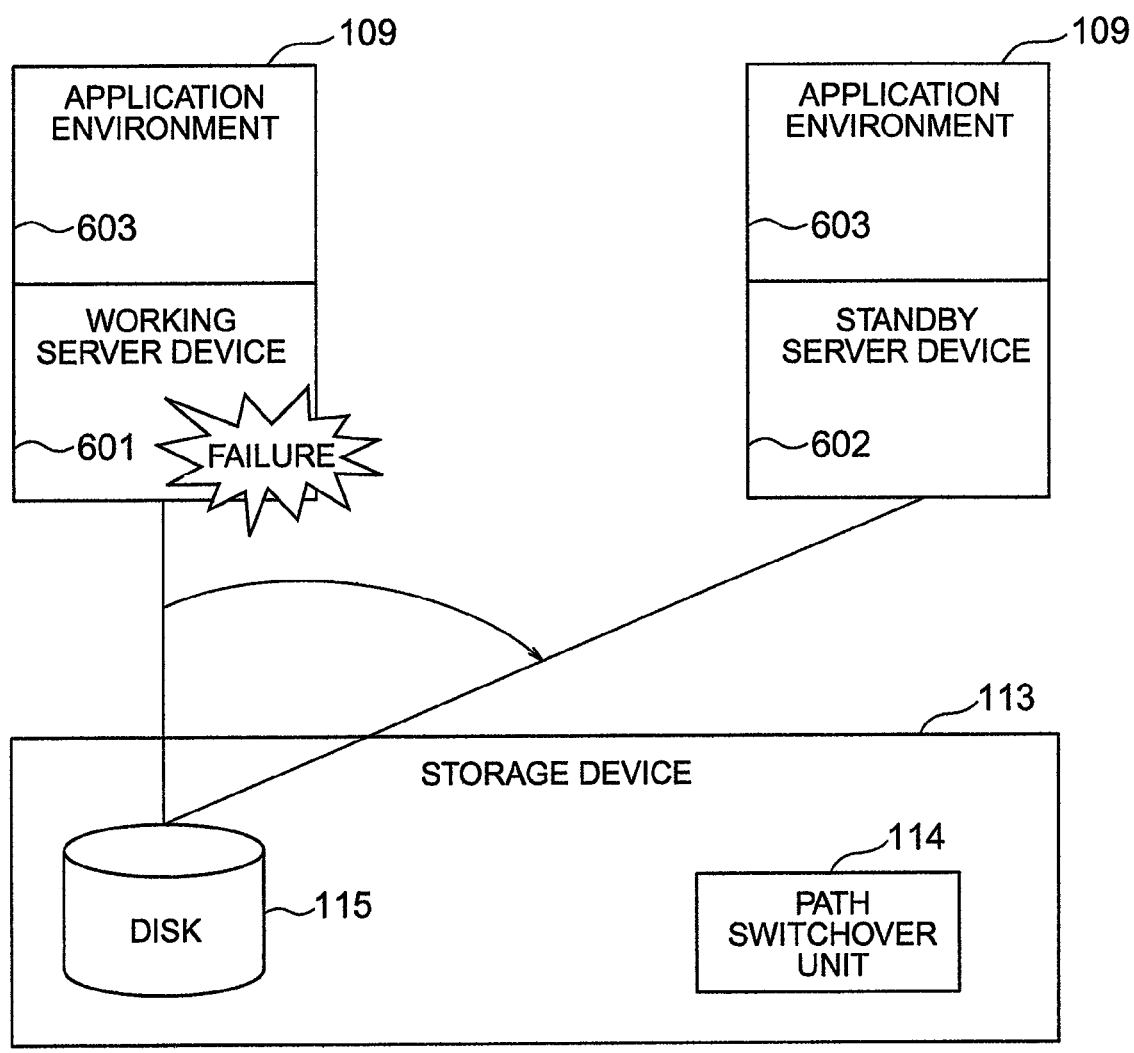
FIG. 6 schematically shows how a failure that has occurred in a server device can be eliminated to continue the on-going operation of the system.

FIG. 6 schematically shows how the switchover operation is performed when a failure occurs in a server device 109. In FIG. 6, when a failure occurs in one of the working server devices (working computers) 601, the failure is eliminated by using a standby server device (standby computer) 602. The application environment management unit 603 is configured by connecting the working server device 601 with the disk 115 in the storage device 113. When a failure occurs in the working server device 601, the failure detection unit 301 detects the failure. Then, the server switchover unit 302 delivers to the path switchover unit 114 in the storage device 113 a demand to switch over the working and standby server devices.

The path switchover unit 114, after having received the demand, switches the connecting path between the disk 115 and the working server device 601, to the connecting path between the disk 115 and the standby server device 602. Hence, when a failure occurs in the working server device 601, the failed working server device 601 is thus replaced by the standby server device 602, which takes over the ongoing task. The disk 115 thus taken over by the standby server device 602 may be a system disk storing an application environment itself therein or a disk for data to be used by the application environment.

Figure 7:
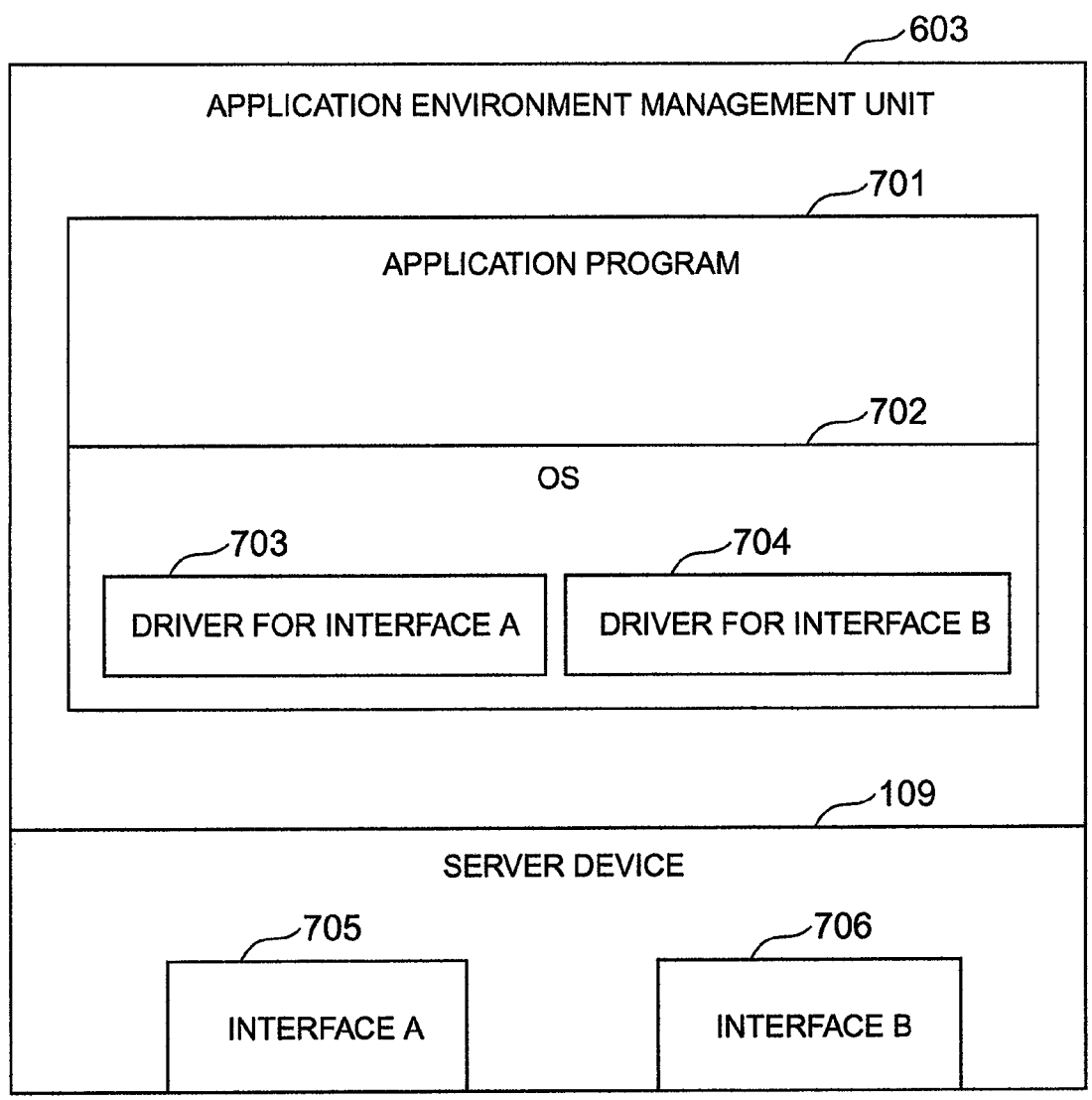
FIG. 7 schematically shows the configuration of an application environment management unit included in the server device shown in FIG. 5.

FIG. 7 schematically shows an example of the relationship between the application environment management unit 603 and interfaces 705, 706. The server device 109 includes plural interfaces such as interface A 705 and interface B 706. The application environment management unit 603 in the server device 109 manages the application environment consisting of an OS 702 and an application program 701 on the OS 702. In order for the server device 109 to be started up with the OS 702, interface drivers 703, 704 adapted to the interfaces 705, 706 must be installed in the OS 702.

In general, the application environment management unit 603 manages the application environment consisting of the operating system (OS) 702 and the application program 701. The OS 702 includes the drivers 703, 704 for controlling the operations of the interfaces 705, 706 included in the server device 109 and for transferring data to and from external devices. The application environment management unit 603 is a program, and desired processes are carried out by executing the program by the processor 502. However, the application environment management unit 603 can also be configured in the form of hardware with an integrated circuit on a microchip.

The drivers 703, 704 must be adaptively provided for the interfaces 705, 706 respectively. For example, the interface A driver 703 is provided for the interface A 705 whereas the interface B driver 704 is provided for the interface B 706. Namely, drivers adapted to interfaces must be previously installed in the OS 702. If a new interface (not shown) is to be installed in the server device 109, a driver adapted to the new interface must be installed beforehand in the OS 702.

Figure 8:
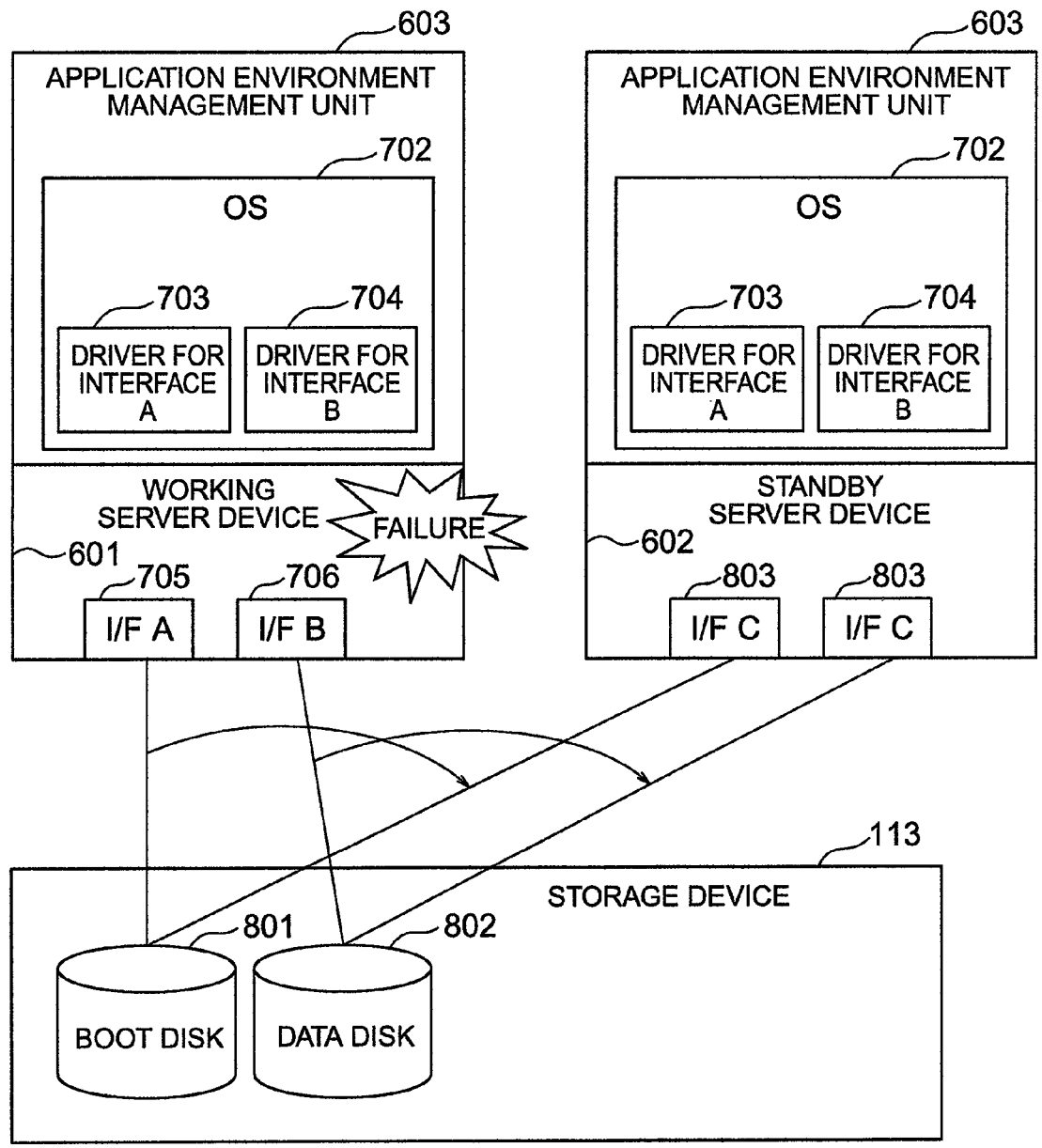
FIG. 8 schematically shows how a failed working server device is replaced by a standby server device to continue the on-going operation of the system, in the case where the configurations of the working and standby server devices are different from each other.

FIG. 8 schematically shows how the conventional initial configuration of failover environment is set up. FIG. 8 shows an example in which the interfaces of the working physical server 601 are different in type from the interfaces of the standby physical server 602. The interface A 705 is connected with a boot disk 801 in the storage device 113 whereas the interface B 706 is connected with a data disk 802 in the storage device 113. In this environment, when a failure occurs in the working server device 601, it is expected that the boot disk 801 and the data disk 802 should be connected respectively with the interfaces C 803 of the standby server device 602.

However, even though the boot disk 801 and the data disk 802 are logically switched over to the standby server device 602, since the drivers adapted to the interfaces C 803 are not installed in the OS 702 of the application environment management unit 603, the standby server device 602 cannot operate due to the lack of the drivers capable of controlling the interfaces C 803.

In order for the normal operation to continue after the switchover of the disks 801, 802 to the standby server device 602, the drivers adapted to the interfaces C 803 must be installed beforehand in the OS 702 prior to the switchover. Traditionally, therefore, necessary types of drivers must be previously installed in the stage of initial configuration by performing prerequisite switchover operations until the same repetitive number is reached as the number of possible combinations of interfaces and drivers adapted thereto.

Figure 9:
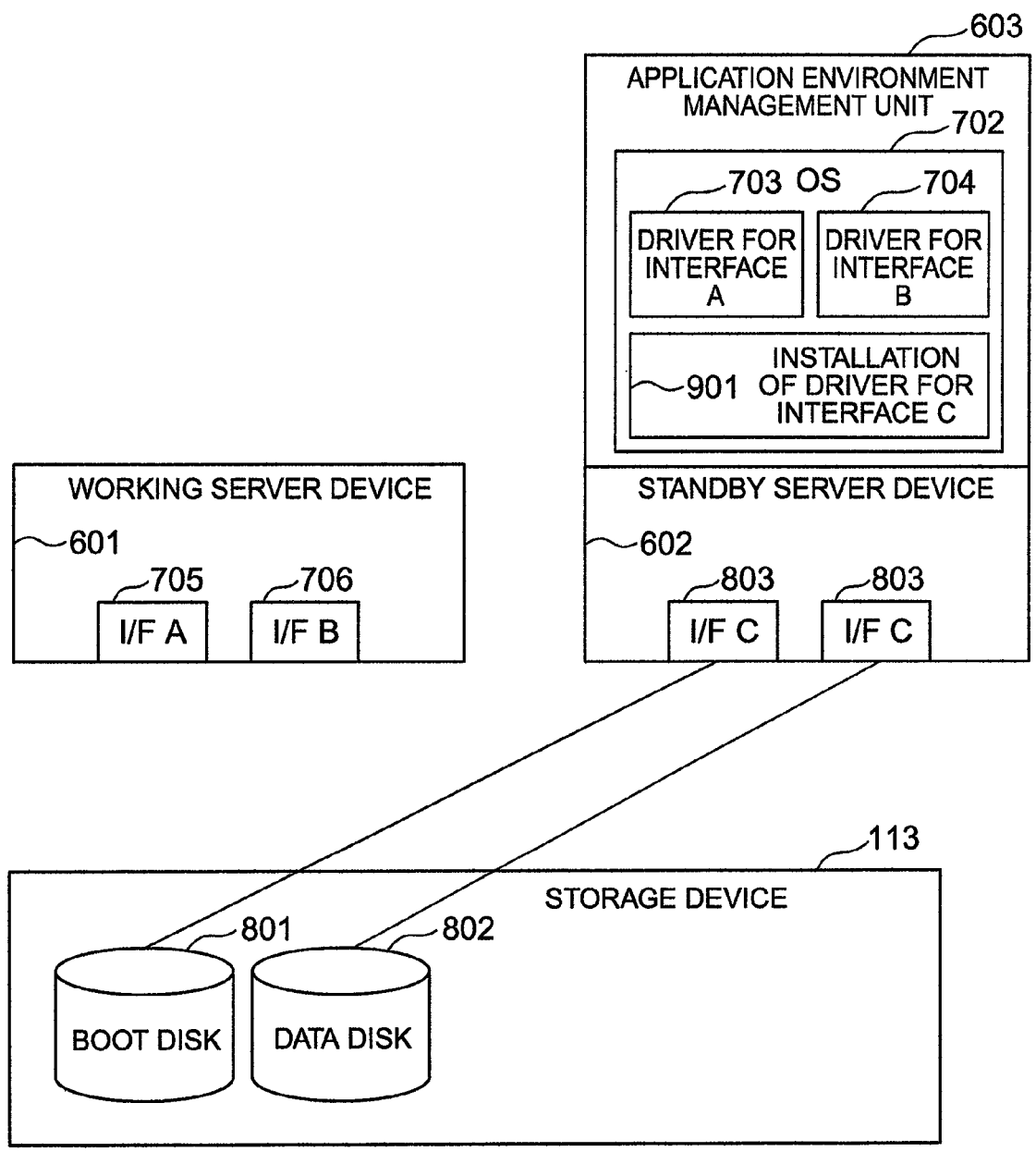
FIG. 9 schematically shows how a conventional failover environment is initially configured.

FIG. 9 schematically shows how a conventional failover environment is initially configured, that is, necessary types of drivers are installed in the stage of initial configuration.

To start up the OS 702 with the standby server device 602, a driver 901 adapted to the I/F C 803 must be installed in the OS 702. In conventional initial configuration, the standby server device 602 selects specific I/Fs adapted to the drivers 703, 704 which the OS 702 includes, and the OS 702 is started up. Then, the I/F C 803 is provided in the standby server device 602 and the driver 901 for the interface C 803 is installed in the OS 702. By following this procedure wherein the standby server device 602 helps install the driver adapted to the I/F C 803, the operating environment must be configured in the conventional method.

Figure 10:
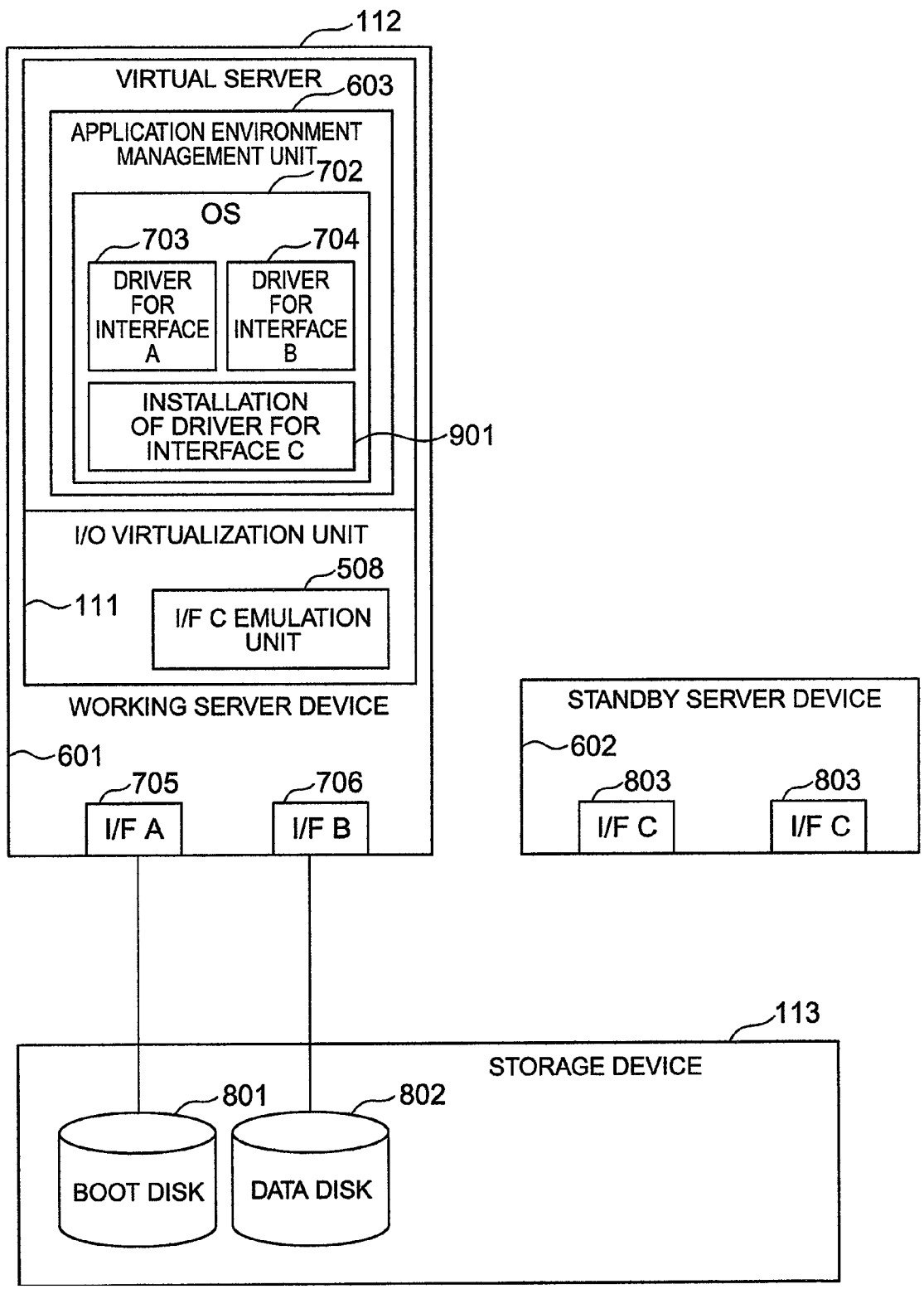
FIG. 10 schematically shows how a failover environment is initially configured according to this invention.

FIG. 10 schematically shows how a failover environment is initially configured according to this invention. The working server device 601 starts up the I/O virtualization unit 111 and the virtual server 112. The interfaces C 803 which the standby server device 602 includes, are previously detected. The I/F C emulation unit 508 in the I/O virtualization unit 111 emulates the I/F C 803 so that the OS 702 views the I/F C 803 as if it actually existed. As a result of this, the driver 901 for the I/F C 803 can be installed in the OS 702.

In case where plural working server devices 601 are used, all the working server devices can simultaneously start up their I/O virtualization units 111 and virtual servers 112. This mode of start-up operation can shorten the initial configuration time. Also, drivers adapted to standby server device 602 can be installed at the same time.

In fact, according to conventional techniques, the OS 702 was not able to know what interfaces the standby server device 602 includes, until the working server device 601 was actually switched over to the standby server device 602. Therefore, the operations of installing drivers must be performed as required by repeating the switchover operations until the same repetitive number is reached as the number of possible combinations of interfaces and drivers adapted thereto.

According to the embodiment 1 of this invention, on the other hand, the initial configuration of drivers through switchover operations can be dispensed with by detecting the interfaces included in the standby server device 602 beforehand and emulating the interfaces, with the result that the drivers adapted to the emulated interfaces are installed in the OS 702. This enables the failover environment to be configured much more quickly and can also reduce the errors in the initial configuration to a great extent since the complicated switchover tasks performed by executing dedicated programs can be dispensed with.

FIG. 11 shows an example of the configuration management table 104 included in the management server 101 shown in FIGS. 1 and 2. Column 1101 contains server device identifiers. Column 1102 indicates power source statuses for the server devices whose identifiers are listed in the column 1101. For example, the column 1102 indicates whether the listed server devices are turned on or off. Column 1103 contains the operational statuses of I/O virtualization units 111: if the I/O virtualization unit 111 has been started up in a specific server device 109, it is "ON" status whereas if the I/O virtualization unit 111 has not yet been started up in the specific server device 109, it is "OFF" status.

Column 1104 contains the I/O devices included in the listed server devices 109 and is further divided into sub-column 1105 for indicating the types of the I/O devices and sub-column 1106 indicating whether or not the I/O devices have been emulated or not. In Column 1105, all types of I/O devices connected to the server devices 109 specified by their particular identifiers are listed.

The sub-column 1106 indicates whether or not the listed types of I/O devices are emulated ones. Column 1107 contains disks allocated to the respective types of I/O devices. If the I/O device is a hot bus adapter HBA, a disk 115 in the storage device 113 is allocated thereto.

Data on the boot disk 801 and the data disk 802 as shown in FIG. 10 may be added to the information listed in the column 1107. Such addition of data on the boot disk 801 and the data disk 802 may be achieved, for example, through input by an administrator. Or the order in which disks are found by the OS 702 may be added as such additional data. For the first found disk is most probably the boot disk.

Column 1108 contains the drivers already installed in the associated server devices. Column 1109 indicates server operation statuses. The server device management table 108 makes it possible to manage the I/O devices allocated to the server devices 109 and the already installed drivers.

FIG. 12 shows an example of the I/O device management table 105 included in the management server 101 shown in FIGS. 1 and 2. The I/O management table 105 indicates the suited combinations of the I/Fs for I/O devices and the types of the I/O devices that are, for example, HBAs. Column 1201 contains I/O device data. The column 1201 consists of sub-column 1202 containing the I/Fs for I/O devices, sub-column 1203 containing the types of I/O devices, and sub-column 1204 containing firmware versions related to the I/O devices.

The sub-column 1202 contains the I/Fs for I/O devices. The sub-column 1203 lists the types of I/O devices adapted to the I/F for I/O devices. Actually, the sub-column 1203 contains such data as on the types and configurations of HBAs. Plural types of I/O devices may sometimes correspond to a single I/F for I/O device. The sub-column 1204 contains data on the drivers adapted to different types of I/O devices and firmware versions. Since a single I/O device may have plural firmware versions, the sub-column 1204 lists all the available firmware versions. The data contained in the I/O device management table 105 can be obtained from the definition file included in the management server 101. The management server 101 fetches the definition file from a vendor via a network.

FIG. 13 shows an example of the I/F management table 106 included in the management server 101 shown in FIGS. 1 and 2. The I/F management table 106 is used to manage the drivers adapted to the I/Fs for I/O devices, essential for the operation of the OS. Column 1301 contains I/Fs for I/O devices. Column 1302 contains the names of the I/F drivers adapted to the I/Fs for I/O devices. The data contained in the I/F management table 106 can be obtained from the definition file included in the management server 101. The definition file is provided for the management server 101 by a vendor via a network. Thus, data on the IF drivers adapted to the I/Fs for I/O devices can be obtained from the I/F management table 106.

FIG. 14 shows an example of the server switchover management table 107 included in the management server 101 shown in FIGS. 1 and 2. Column 1401 contains server device identifiers. It is possible to fetch the server device identifiers through SVP 110 even when power to server devices is turned off. Column 1402 lists the standby server devices 602 that, in failover operation, replace the working server devices 601 in which failures occur. A single standby server device 602 may be made to correspond to plural working server devices 601.

Column 1403 indicates whether or not the failover environment has been set up in the initial configuration. The status of failover setting consists of "already set", "under setting" and "no setting".

Figure 15:
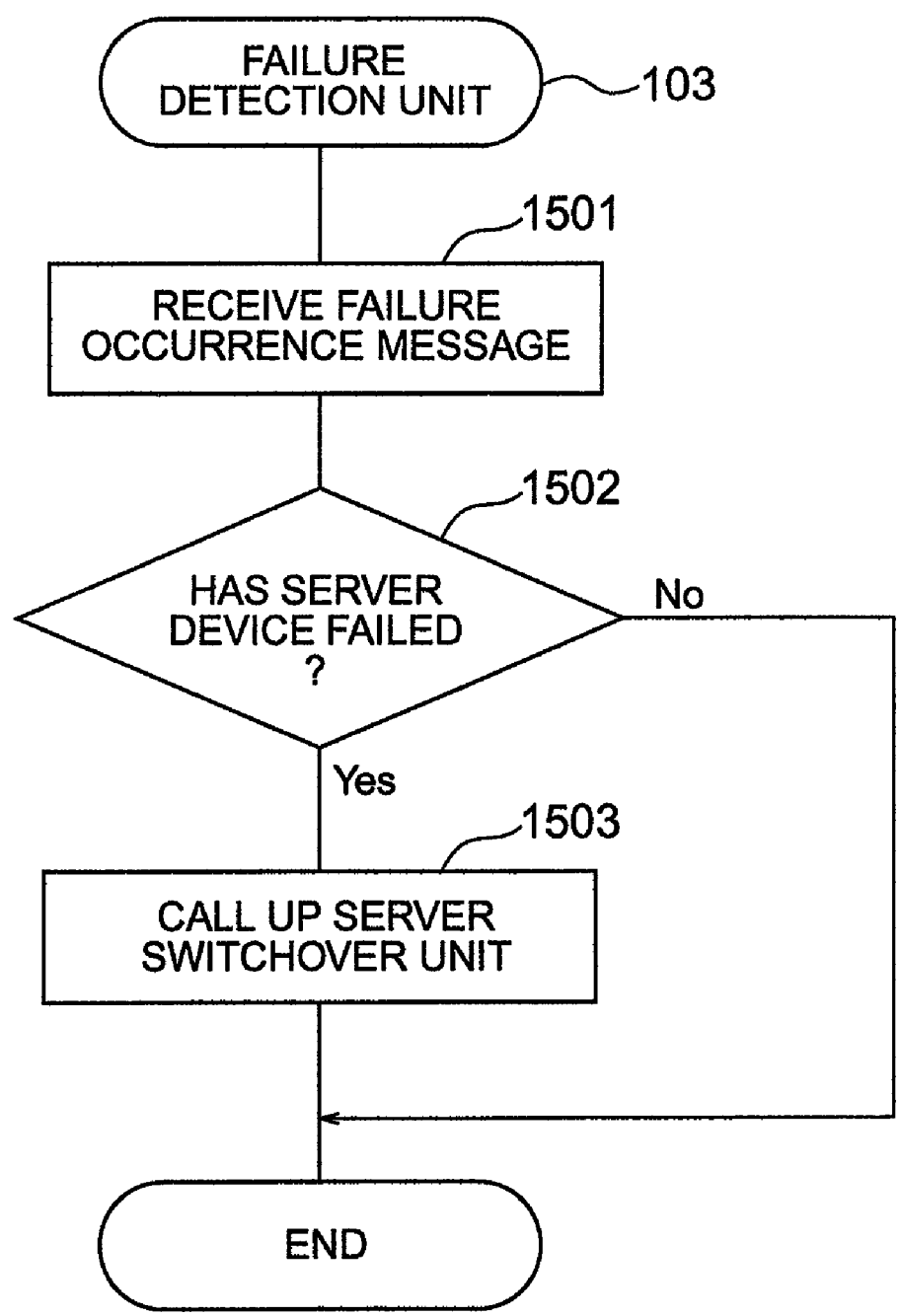
FIG. 15 is a flow chart for the operation of a failure detection unit included in the failure management unit shown in FIG. 3.

FIG. 15 is a flow chart for the operation of the failure detection unit 301 included in the failure management unit 102 shown in FIG. 3. The failure detection unit 301 starts its processing operation in response to the failure message issued from the server device 109 or the SVP 110 and performs the switchover of the servers for recovering the system from the failure. The failure occurrence message reception unit receives the failure occurrence message (Step 1501). The failure occurrence message is transferred to the management server 101 from the device where a failure occurred. A failure occurring in the server device 109, the VSP 110 or the storage device 113, or a failure occurring in the management server 101 proper can be detected.

The failure detection unit 301 judges whether the server device 109 has failed Step 1502). If the server device 109 fails, the failure management unit 102 calls up the server switchover unit 302 (Step 1503). When the server switchover unit 302 is called up, the failure occurrence message containing data on the identifier of the failed server 109, the location of the failure and the seriousness of the failure is transferred thereto as the failure parameters. If such a failure occurs in a network device or a storage device outside the server device 109, the flow ends without the switchover of the server device 109. In accordance with this process flow, judgment is made on which server has failed, and the server switchover unit 302 performs the switchover from the failed working server device 601 to a standby server device 602 (Step 1503).

Figure 16:
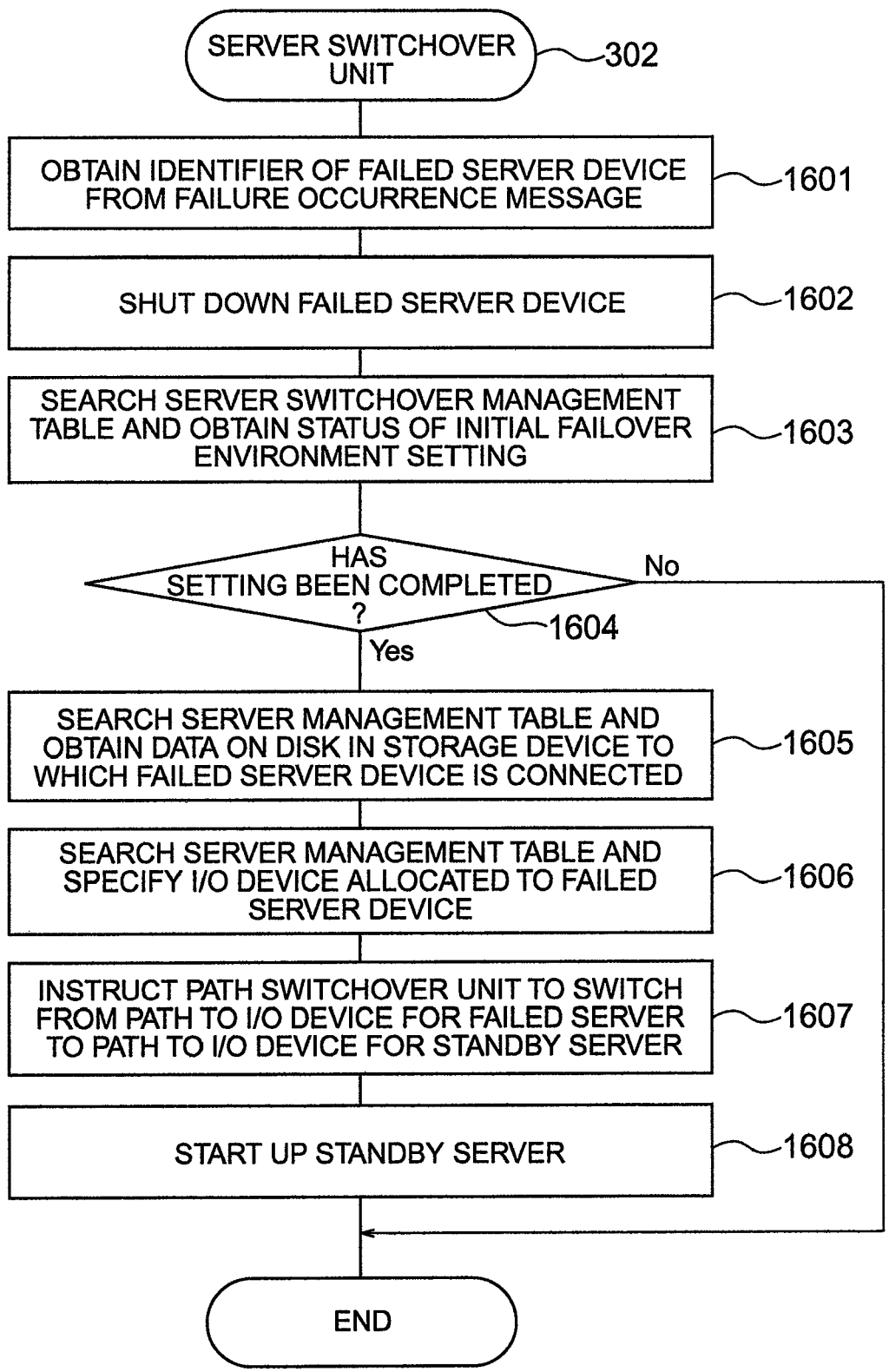
FIG. 16 is a flow chart for the operation of a server switchover unit included in the failure management unit shown in FIG. 3.

FIG. 16 is a flow chart for the operation of the server switchover unit 302 included in the failure management unit shown in FIG. 3. First, the identifier of the failed server device 109 is obtained from the failure occurrence message (Step 1601). Depending on the content of the failure occurrence message, the setting of whether the switchover is made or not, can be made. Then, the failed server device 109 is shut down (Step 1602). This step 1602 is necessary to prevent the failed server device 109 from issuing unwanted I/Os and to release from the server device 114 the I/O device 117 allocated thereto.

Next, the server switchover management table 107 is searched to obtain the setting for the initial configuration of failover environment (Step 1603). The server switchover unit 302 checks the data on the setting for the initial configuration of failover environment obtained in Step 1603, and if the setting has been already completed, Step 1605 is reached (Step 1604). If, on the other hand, the setting is under way or has not been tried, the process flow ends without the switchover of servers. The server switchover unit 302 fetches the data on the server to replace the failed server from the column 1402 of the server switchover management table 107 and specifies a particular standby server device 602 to be used after switchover.

Now, the configuration management table 104 is searched to obtain the data on the disk in the storage device connected with the failed server device 109 (Step 1605). This step 1605 is necessary to switch the disk connected with the failed working server device 601 over to the specified standby server device 602. The configuration management table 104 is searched to obtain the data on the I/O device allocated to the failed server device (Step 1606). Judgment is then made on which server device 109 should have its I/F 705 switched over. The data on the I/O device to be used after switchover with the standby server device 602 can also be obtained from the configuration management table 104.

The server switchover unit 302 instructs the path switchover unit 114 to switch from the path to the I/O device for the failed server device 601 to the path to the I/O device for the standby server device 602 (Step 1607). Finally, the standby server device 602 is started up (Step 1608). Since the disk 115 previously connected with the failed working server device 601 has now been switched over to the standby server device 602, the disk 115 can be used in the same condition as it assumed before the switchover. According to this process flow, when a failure occurs in a working server device 109, the disk 115 connected with the failed server device 109 can be taken over by a standby server device 109.

Figure 17:
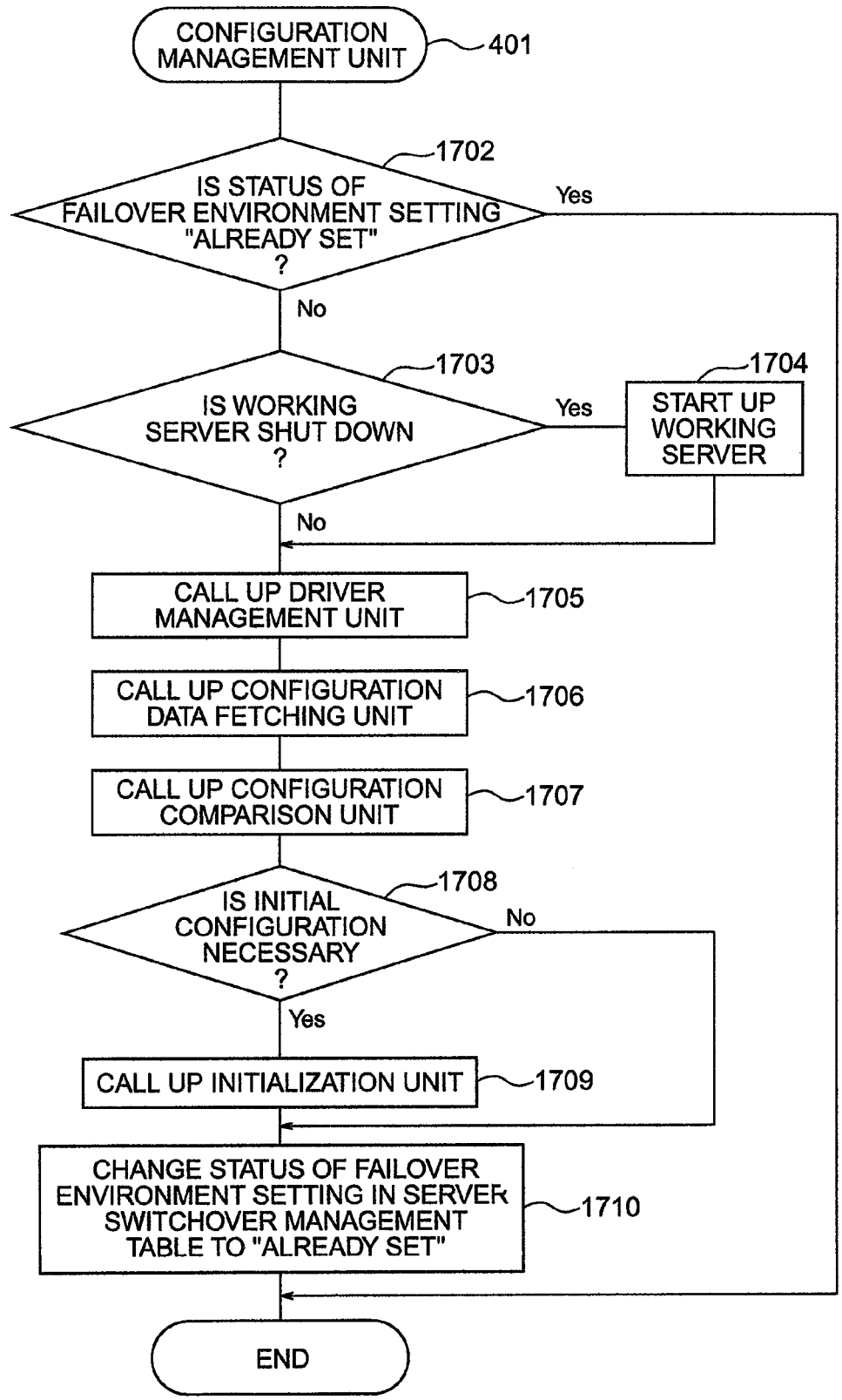
FIG. 17 is a flow chart for the operation of a configuration management unit included in the initial configuration management unit shown in FIG. 4.

FIG. 17 is a flow chart for the operation of the configuration management unit 401 included in the initial configuration management unit 103 shown in FIG. 4. The configuration management unit 401 searches the column 1403 of the server switchover management table 107 for the status of the failover environment setting and judges whether the status is "already set", "under setting" or "no setting" (Step 1702). If the status is "no setting", Step 1703 is reached. If, on the other hand, the status is "already set" or "under setting", the process flow ends.

The configuration management unit 401 in the working server searches the configuration management table 104 to judge whether or not the working server device 601 is shut down (Step 1703). If the working server device 601 has not yet been shut down, Step 1705 is reached whereas if it has been shut down, Step 1704 is reached.

The configuration management unit 401 instructs the server boot unit 116 to start up the server device 601. The server boot unit 116 starts up a specific working server device 601 (Step 1704).

The configuration management unit 401 calls up the driver management unit 404 (Step 1705).

The driver management unit 404 obtains the data on the driver installed in the disk 115 connected with the working server device 601. Then, the column 1108 of the configuration management table 104 is called up and the data on the driver already installed in the disk 115 is stored in the column 1108 (Step 1705).

Then, the configuration management unit 401 calls up the configuration data fetching unit 403. The configuration data fetching unit 403 obtains, via a mini-OS 2003, the data on the I/O device for the standby server device 602 specified in the server switchover management table 107 (Step 1706). The obtained data representing the type of I/O device is stored in the sub-column 1105 of the configuration management table 104.

The configuration management unit 401 calls up the configuration comparison unit 402. The configuration comparison unit 402 compares the data on the driver in the disk 115 connected with the working server device 601 with the data on the I/F for the standby server device 602 (Step 1707). After the comparison, the data on whether or not a new driver should be installed is delivered to Step 1708 as the result of the comparison.

The configuration management unit 401 switches over the disk 115 from the working server device 601 to the standby server device 602 in accordance with the result of the comparison derived from the configuration comparison unit 402 called up in the step 1707, and then judgment is made on whether or not the standby server device 602 can continuously use the disk 115 (Step 1708). If the standby server device 602 can continuously use the disk 115, judgment is made that there is no need for the initial configuration, and Step 1710 is reached. If the standby server device 602 cannot continuously use the disk 115, judgment is made that there is need for the initial configuration, and the initialization unit 405 is called up (Step 1709). It is noted here that the initial configuration is necessary if judgment is made that a new driver must be installed, in the step 1707.

Next, the configuration management unit 401 calls up the initialization unit 405. The initialization unit 401 starts up the initial configuration of the failover environment with respect to the working server device 601 (Step 1709). According to this process flow, the initial configuration of the failover environment can be set up.

Finally, the configuration management unit 401 renews the status in the column 1403 of the server switchover management table 107 with "already set" (Step 1710).

Figure 18:
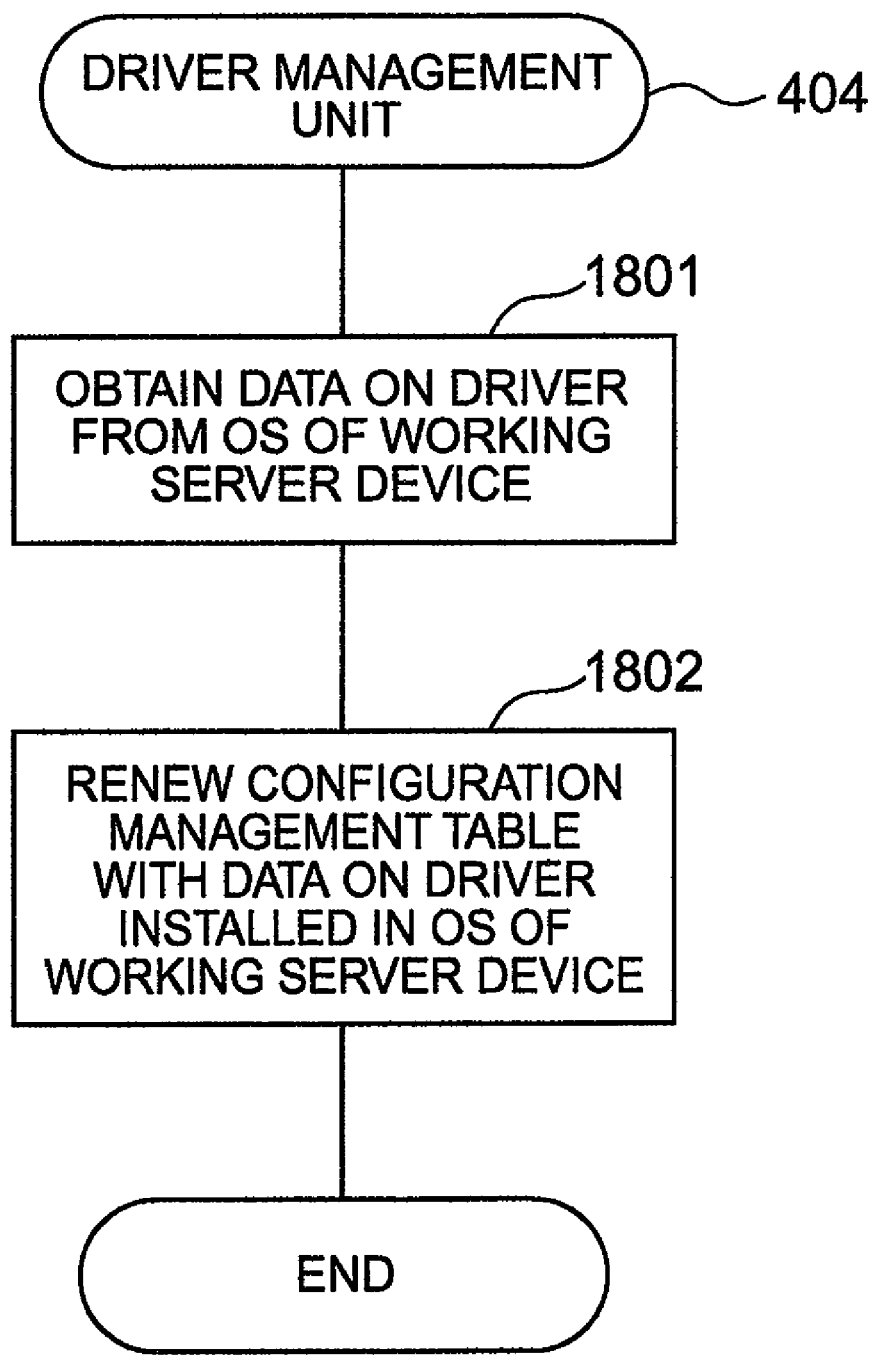
FIG. 18 is a flow chart for the operation of a driver management unit included in the initial configuration management unit shown in FIG. 4.

FIG. 18 is a flow chart for the operation of the driver management unit 404 included in the initial configuration management unit 103 shown in FIG. 4. The driver management unit 404 is called up by the configuration management unit 401. The driver management unit 404 obtains the data on the driver installed in the OS 702 of the working server device 601 (Step 1801). The driver management unit 404 feeds the data on the driver obtained in the step 1801 into the column 1108 of the configuration management table 104 to renew the old driver data in the column 1108 (Step 1802).

According to this process flow, the data on the installed driver can be obtained and set in the configuration management table 104. Whenever the OS 702 is started up, the driver management unit 404 is called up and can obtain the required driver data. Also, at the time of driver renewal or new installation, the driver management unit 404 is called up and can obtain required driver data.

Figure 19:
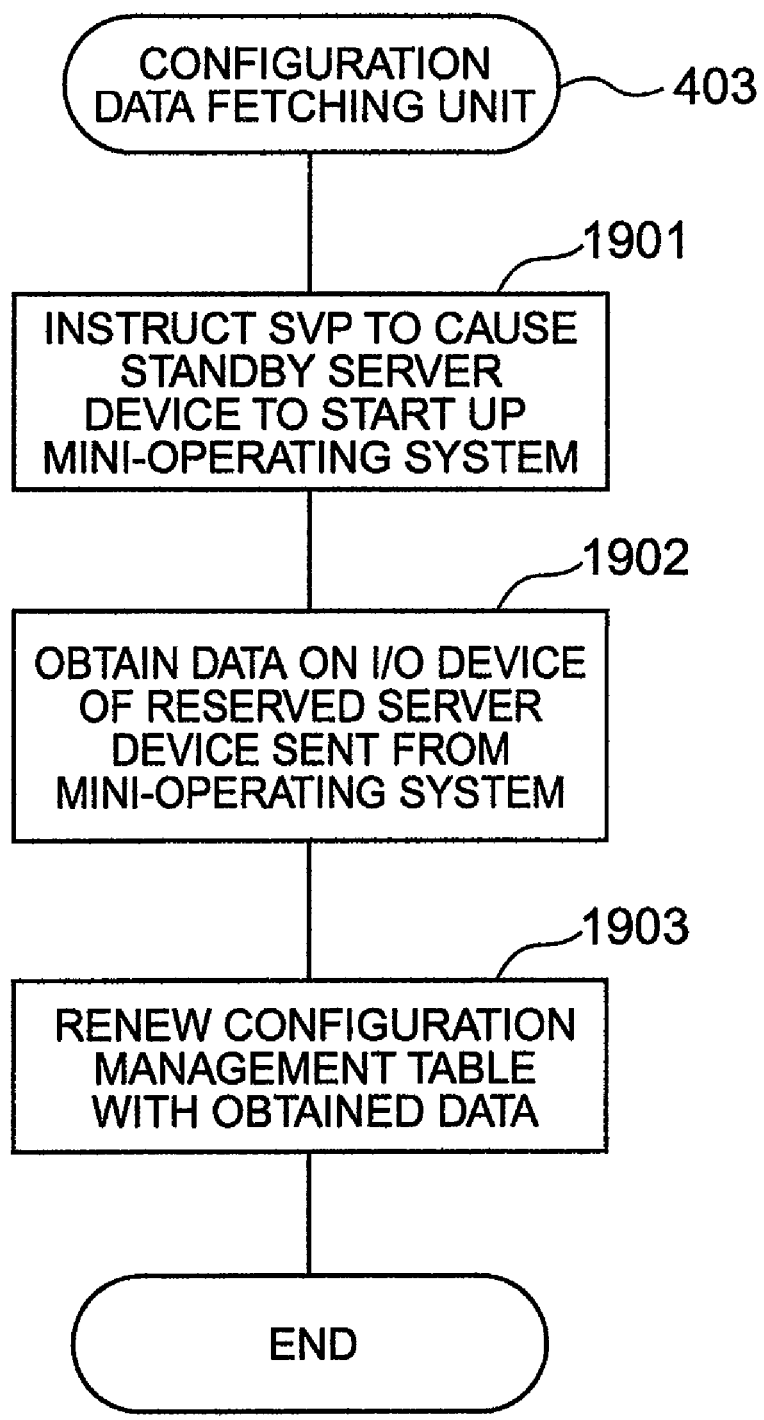
FIG. 19 is a flow chart for the operation of a configuration data fetching unit included in the initial configuration management unit shown in FIG. 4.

FIG. 19 is a flow chart for the operation of the configuration data fetching unit 403 included in the initial configuration management unit 103 shown in FIG. 4. The configuration data fetching unit 403 is called up by the configuration management unit 401 (Step 1706). After searching the server switchover management table 107, the configuration data fetching unit 403 commands, via a network, the SVP 110 to cause the intended standby server device 602 to start up a mini-operating-system (referred to as mini-OS) (Step 1901). The SVP 110, receiving this command, causes the standby server device 602 to network-boot the mini-OS. The mini-OS may be previously provided in the standby server device 602 or delivered into the standby server device 602 from the configuration data fetching unit 403 or the SVP 110.

The mini-OS, upon being started up, obtains the data on the I/Fs for and the server configuration of, the standby server device 602 (Step 1902). And the configuration data fetching unit 403 feeds the data obtained by the mini-OS in the step 1902 into the sub-column 1105 of the configuration management table 104 to renew the content thereof (Step 1903). According to this process flow, the data on the I/Fs for the standby server device 602 are obtained.

Figure 20:
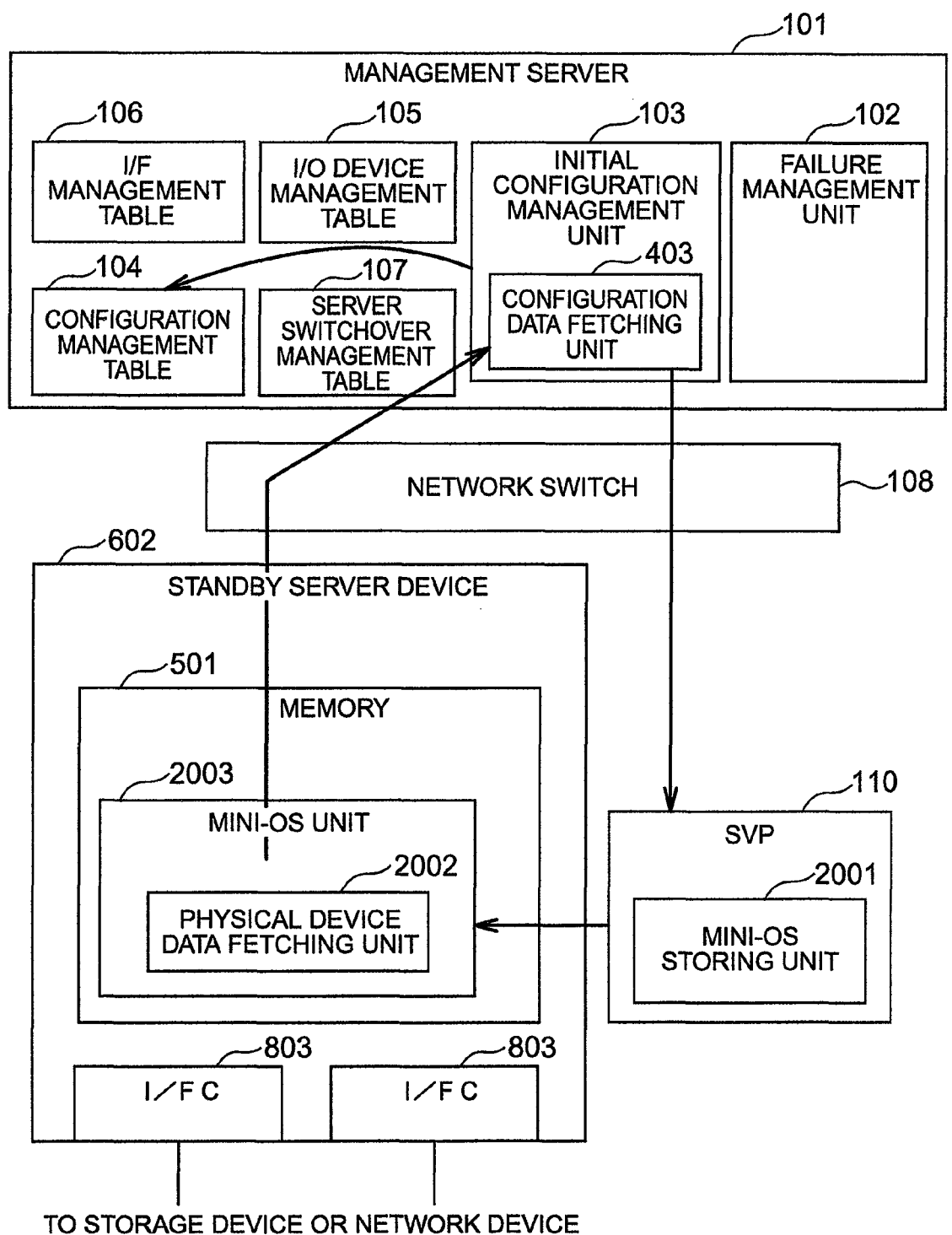
FIG. 20 schematically shows how configuration data are acquired in an embodiment of this invention.

FIG. 20 depicts an example of the operation of the configuration data fetching unit 403 for obtaining the data on the I/Fs included in the standby server device 602. The SVP 110 includes a mini-OS storing unit 2001. The mini-OS 2001 is instructed by the configuration data fetching unit 403 called up by the initial configuration management unit 103, to start up the mini-OS unit 2003 in the specified standby server device 602. The mini-OS unit 2003 may be previously provided in the standby server device 602 or delivered into the standby server device 602 from the configuration data fetching unit 403 or the SVP 110.

The mini-OS unit 2003 is started up in the memory 501 of the standby server device 602. The intended I/F data is obtained by a physical device data fetching unit 2002 installed in the mini-OS unit 2003, and the obtained I/F data are fed into the configuration data fetching unit 403. The mini-OS unit 2003 can obtain the data on the hardware configuration of standby server device 602 and network data. The mini-OS unit 2003 sends out the obtained hardware configuration data and network data to the configuration data fetching unit 403. Also, the mini-OS unit 2003 may send out the obtained hardware configuration data and network data to the SVP 110, and the SVP 110 may in turn send those data to configuration data fetching unit 403. The configuration data fetching unit 403 stores the obtained I/F data in the configuration management table 104.

The mini-OS storing unit 2001, the mini-OS unit 2003 and the physical device data fetching unit 2002 are programs. However, each of the mini-OS storing unit 2001, the mini-OS unit 2003 and the physical device data fetching unit 2002 can also be configured in the form of hardware with an integrated circuit on a microchip.

Figure 21:
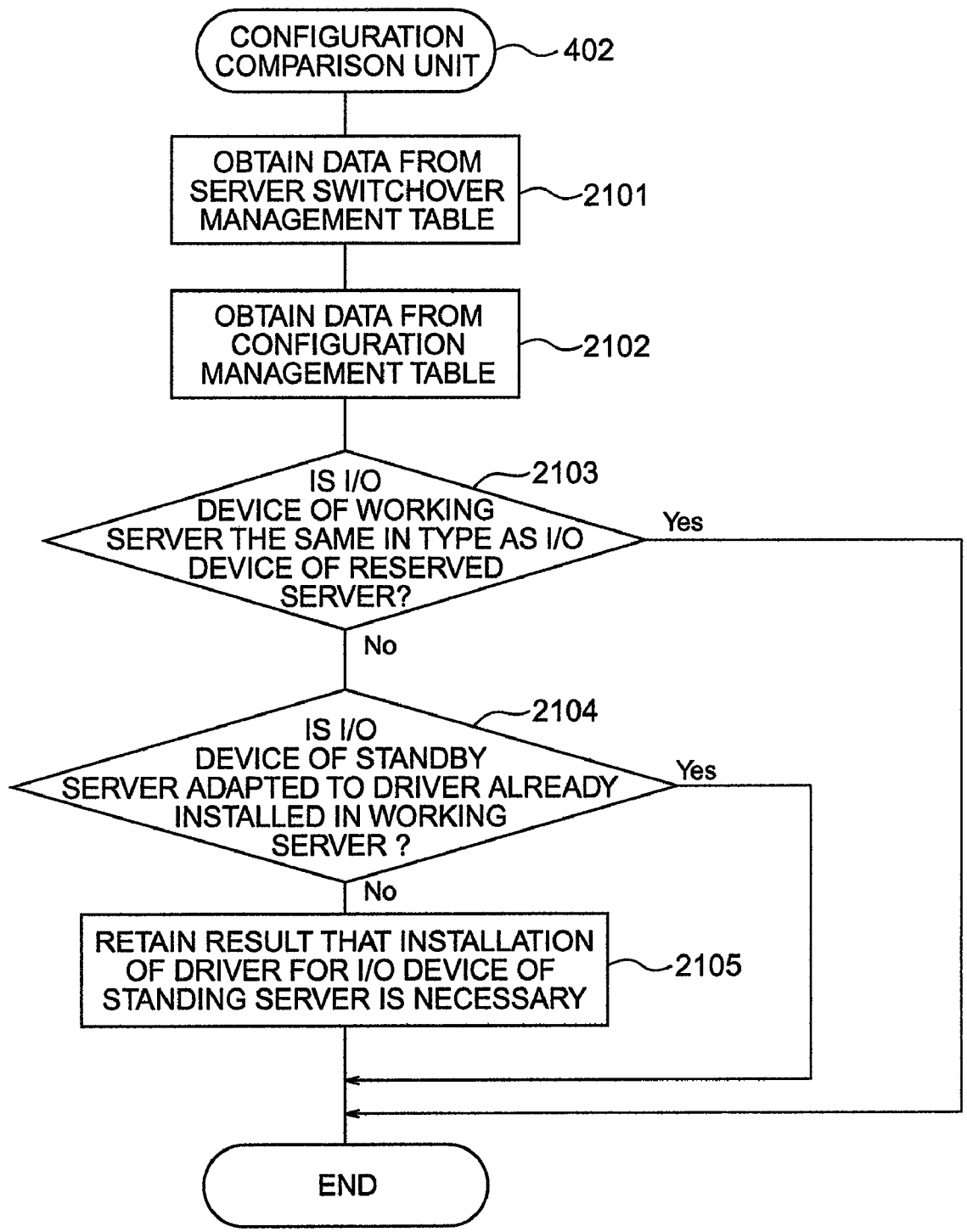
FIG. 21 is a flow chart for the operation of a configuration comparison unit included in the initial configuration management unit shown in FIG. 4.

FIG. 21 is a flow chart for the operation of the configuration comparison unit 402 included in the initial configuration management unit 103 shown in FIG. 4. The configuration comparison unit 402 is called up by the configuration management unit 401 (Step 1707). The configuration comparison unit 402 obtains the data on the server to replace the failed server, from the column 1402 of the server switchover management table 107 (Step 2101). The configuration comparison unit 402 also obtains the suited combination of the working server device 601 and the standby server device 602 and the status of setting of failover environment. Further, the configuration comparison unit 402 obtains the data on the configurations of the working server device 601 and the standby server device 602 from the configuration management table 104 (Step 2102).

At this time, the configuration comparison unit 402 obtains the data on the I/O devices for the servers 109 and compares the I/O device for the working server device 601 with that for the standby server device 602 to check if they are of the same type or not (Step 2103). If they are different in type from each other, Step 2104 is reached. If they are of the same type, judgment is made that there is no need for the installation of driver, and the process flow for configuration comparison ends.

The configuration comparison unit 402 checks whether or not the driver of the I/O device already installed in the OS 702 of the working server device 602 is adapted to the I/O device of the standby server device 602 (Step 2104). If the installed driver is not adapted to the I/O device of the standby server device 602, the status that there is need for driver installation is retained (Step 2105). If they are adapted to each other, judgment is made that there is no need for driver installation, and the process flow for configuration comparison ends.

If the driver for the I/O device of the standby server device 602 is not adapted to the I/O device of the working server device 601, the status that the driver for the I/O device of the standby server device 602 must be installed in the working server device 601 is retained, and the process flow ends (Step 2105). With this process flow, judgment is made on whether or not the initial configuration is necessary, the result of the judgment is retained, and the remaining task is taken over to the step 1708 of the process flow, shown in FIG. 17, for the operation of the configuration management unit 401 which calls up the configuration comparison unit 402.

Figure 22:
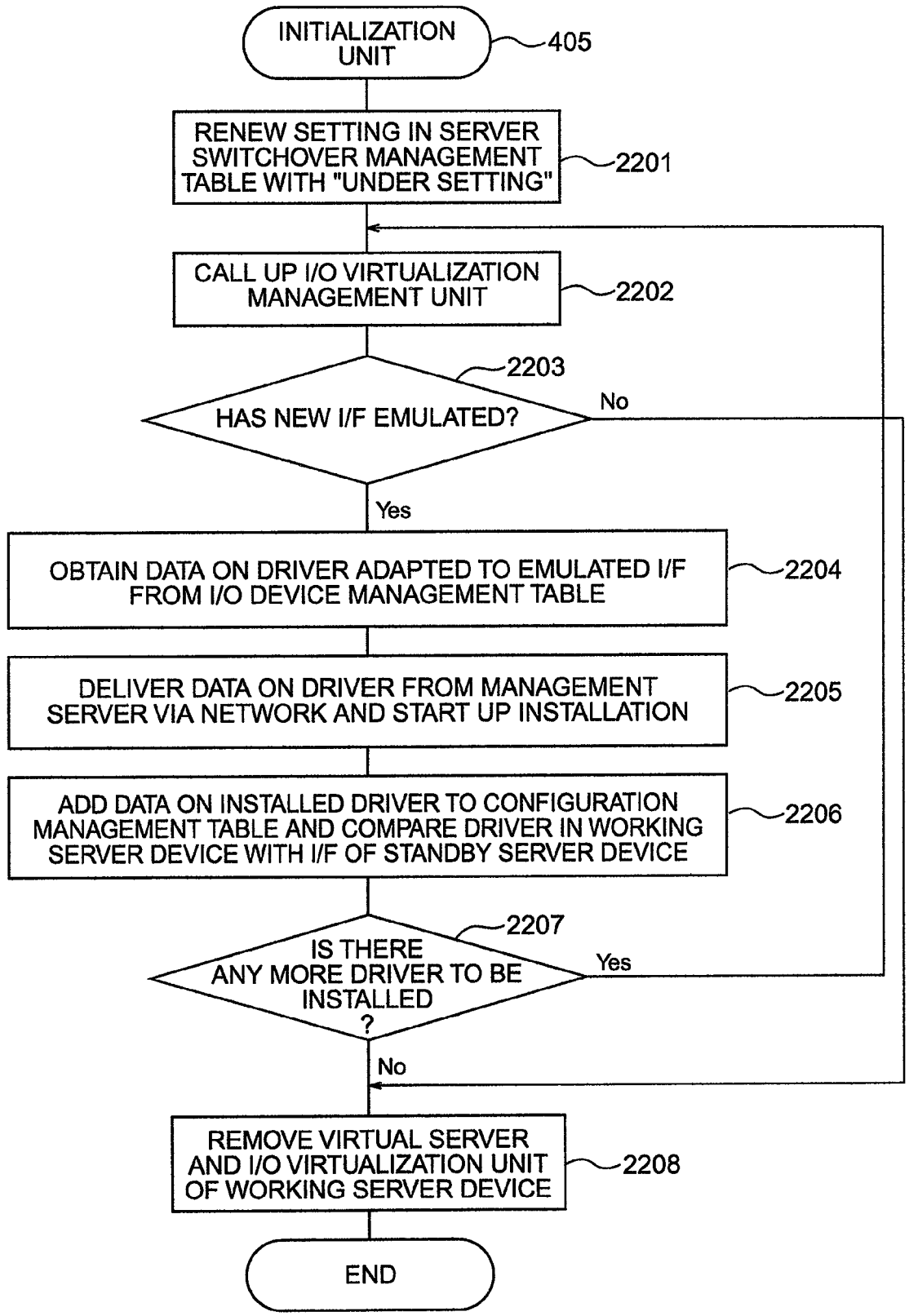
FIG. 22 is a flow chart for the operation of an initialization unit included in the initial configuration management unit shown in FIG. 4.

FIG. 22 is a flow chart for the operation of the initialization unit 405 included in the initial configuration management unit 103 shown in FIG. 4. The initialization unit 405 is called up by the configuration management unit 401 (Step 1709). The initialization unit 405 renews the failover environment setting in the column 1403 of the server switchover management table 107, from the old status to "under setting" (Step 2201). Then, the initialization unit 405 calls up the I/O virtualization management unit 406 and causes it to emulate the I/F of the standby server device 602 when judgment is made that driver installation is necessary (Step 2202). As a result, the driver installation environment is set up in the working server device 601.

The initialization unit 405 judges whether or not the I/O virtualization unit 111 has emulated a new I/F (Step 2203). If the new I/F has been emulated, Step 2204 is reached whereas if not, Step 2208 is reached.

The initialization unit 405 obtains the data on the driver adapted to the emulated I/F from the sub-column 1204 of the I/O device management table 105, and judges which driver to install (Step 2204). The I/O device data column 1201 of the I/O device management table 105 contains the data on the I/O devices and the associated firmware versions. The initialization unit 405 transfers the data on the driver judged in the step 2204 as adapted to the I/F of the standby server device 602 from the management server 101 to the working server device 601 via network so that the driver is installed in the OS 702 in the working server device 601.

Since the OS 702 attempts driver installation whenever it finds a new emulated driver, it installs the driver whose data were fed therein. Upon installation of the driver, the OS 702 communicates with the emulated I/F to ascertain that the driver has been properly installed.

In this embodiment, the OS 702 is triggered into installing a new driver therein by causing the I/F emulation unit 508 (see FIG. 5) of the I/O virtualization unit 111 in the working server device 601 to emulate the I/F of the standby server device 602 and by causing the OS 702 to find a new emulated device.

The initialization unit 405 adds the data on the installed driver to the column 1108 of the configuration management table 104 (Step 2206). The initialization unit 405 compares the drivers installed in the working server device 601 with the I/Fs of the standby server device 602, and checks whether there are still left I/Fs that are not adapted to the installed drivers.

The initialization unit 405 checks whether or not there is any more driver to be installed, and if there is any more driver to be installed, the step 2202 is resumed (Step 2207). The steps 2202~2204 are repeated until there is no more drivers to be installed. If the initialization unit 405 cannot find, in the step 2204, any driver to be installed, Step 2208 is reached.

The initialization unit 405 causes the SVP 110 to remove the virtual server 112 and the I/O virtualization unit 111 (Step 2208). According to this process flow, the driver for the I/F of the standby server device 602 can be installed in the disk 115 connected with the working server device 601 without switching the disk 115 from the working server device 601 over to the standby server device 602.

Although in this embodiment 1 the process of installing a driver without switching a disk from a working server to a standby server, is described, this process may be combined with the process of installing a driver by switching a disk from a working server to a standby server. For example, if judgment is made that the standby server device 602 includes an I/F which is not contained in the I/F management table 106, it is possible to install the driver for the missing I/F by switching the disk from the working server to the standby server, not by emulating the missing I/F in the working server. This process helps further facilitate the configuration of failover environment.

Figure 23:
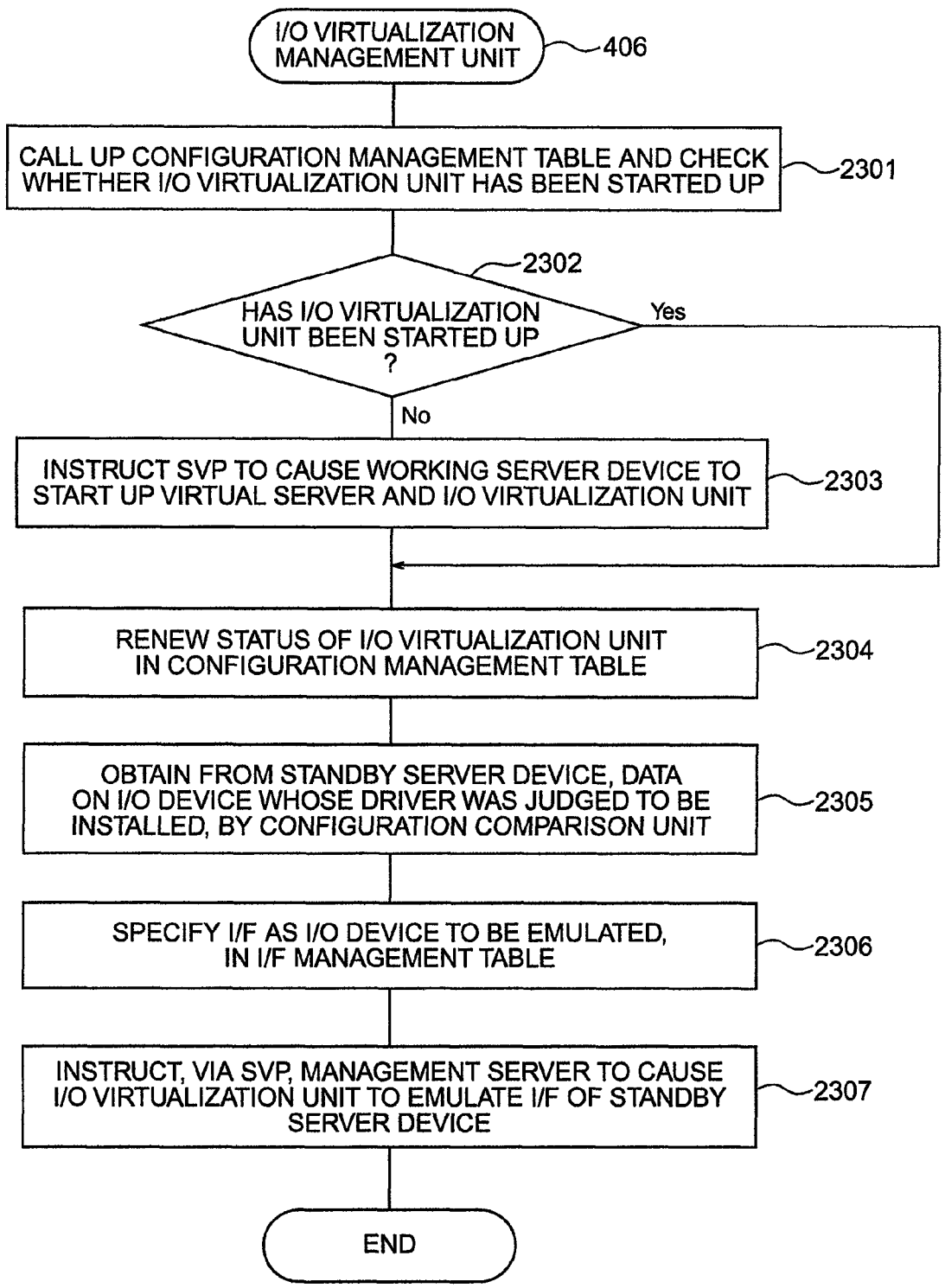
FIG. 23 is a flow chart for the operation of an I/O virtualization management unit included in the initial configuration management unit shown in FIG. 4.

FIG. 23 is a flow chart for the operation of the I/O virtualization management unit 406 included in the initial configuration management unit 103 shown in FIG. 4. The I/O virtualization management unit 406 is called up by the initialization unit 405 (Step 2202 in FIG. 22). The I/O virtualization management unit 406 calls up the configuration management table 104 and fetches the data on the operational status of the I/O virtualization unit 406 from the column 1103 of the configuration management table 104 (Step 2301). Then, the data on the operational status of the I/O virtualization unit 406 of the working server device 601 of interest are checked to judge whether it has been started up or not (Step 2302). If it has not yet been started up, Step 2303 is reached whereas if it has been started up, Step 2304 is reached.

The I/O virtualization management unit 406 sends out a start-up command to the server start-up unit 116 of the working server device 601 via SVP 110. Upon reception of the start-up command, the server start-up unit 116 starts up the virtual server 112 and the I/O virtualization unit 111 (Step 2303). The I/O virtualization management unit 406 renews the content of the column 1103 of the configuration management table 104, rendering the operational status of the I/O virtualization unit 111 to "ON" (Step 2304). Then, the data on the I/O device of the standby server device 602 are obtained from the configuration management table 104 (Step 2305). The I/F corresponding to the obtained data is obtained from the I/O device management table 105, and the I/F to be emulated is specified (Step 2306).

Finally, the I/O virtualization management unit 406 instructs the I/O virtualization unit 111 to emulate the I/F specified in the step 2306 (Step 2307). According to this process flow, the working physical server device 601 can cause the I/O virtualization unit 111 to emulate the I/F included in the standby physical server device 602.

Figure 24:
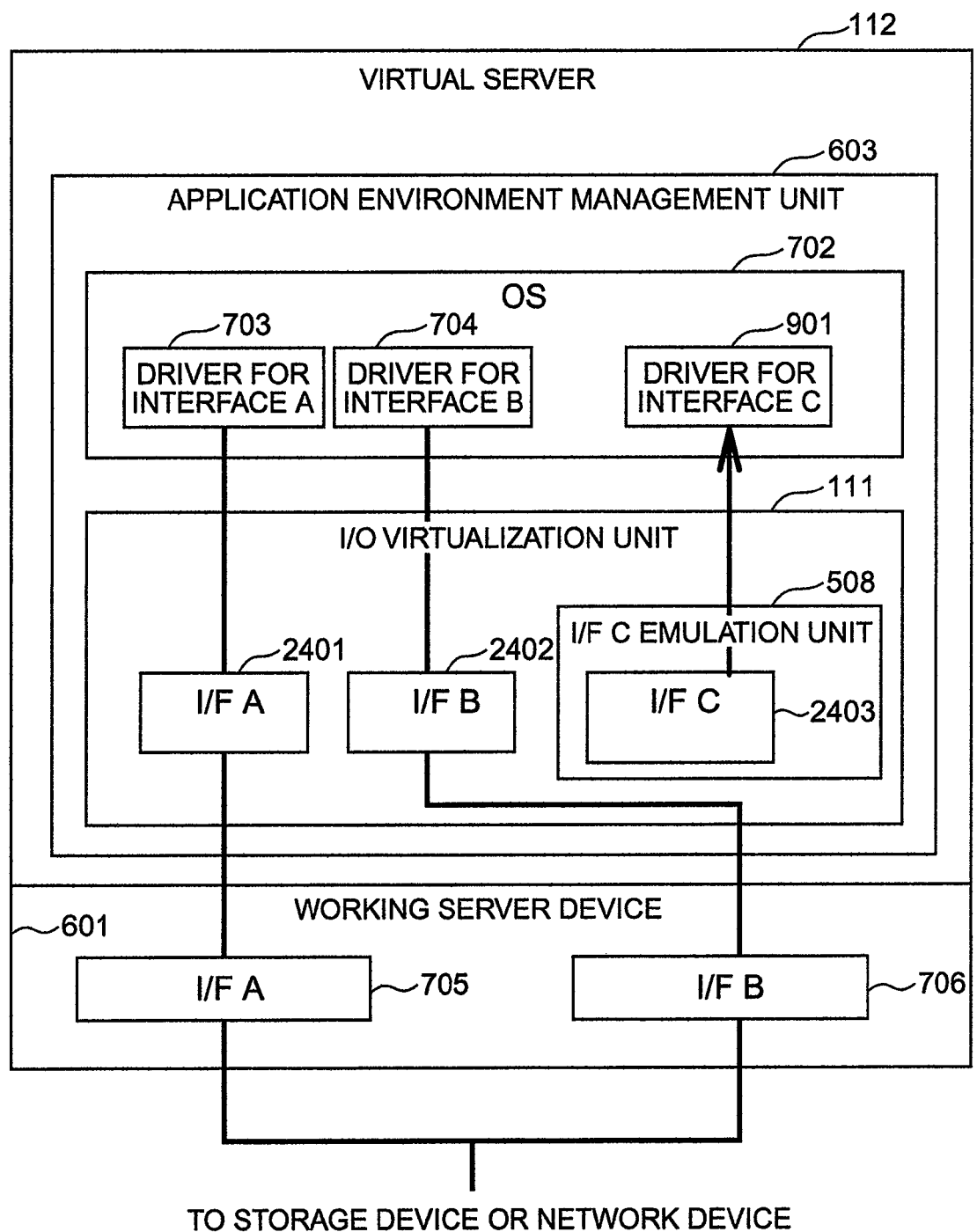
FIG. 24 schematically shows how the I/O virtualization is performed in an embodiment of this invention.

FIG. 24 schematically shows an example of the configuration of the virtual server 112, illustrating how the I/O virtualization is performed in the first embodiment of this invention. I/F A 2401 and I/F B 2402 are I/Fs created by the I/O virtualization unit 111. The I/O virtualization unit 111 is capable of partial virtualization. For example, although the I/F A 2401 and the I/F B 2402 are connected via the I/O virtualization unit 111 with the OS 702, the drivers 703 for the I/F A and the driver 704 for the I/F B can be directly connected respectively with the I/F A 705 and the I/F B 706 of the working server device 601, without the I/O virtualization unit 111 interposed in between. Only the I/F C 2403 can be created through emulation.

The OS 702 can be started up if the drivers 703 for the I/F A and the driver 704 for the I/F B are adapted respectively to the I/F A 2401 and the I/F B 2402. By creating the virtual I/F C 2403 by the I/F C emulation unit 508 in the I/O virtualization unit 111, the OS 702 is tricked into believing that, or sees as if, the I/F C really exists in the working physical server device 601. By causing the OS 702 to recognize the I/F C as a result of the emulation of the I/F C, the OS 702 starts up the installation of the driver 901 for the I/F C. At the time of driver installation, the OS 702 communicates with the emulated I/F C to ascertain whether or not the driver 901 has been normally installed.

Embodiment 2

Figure 25:
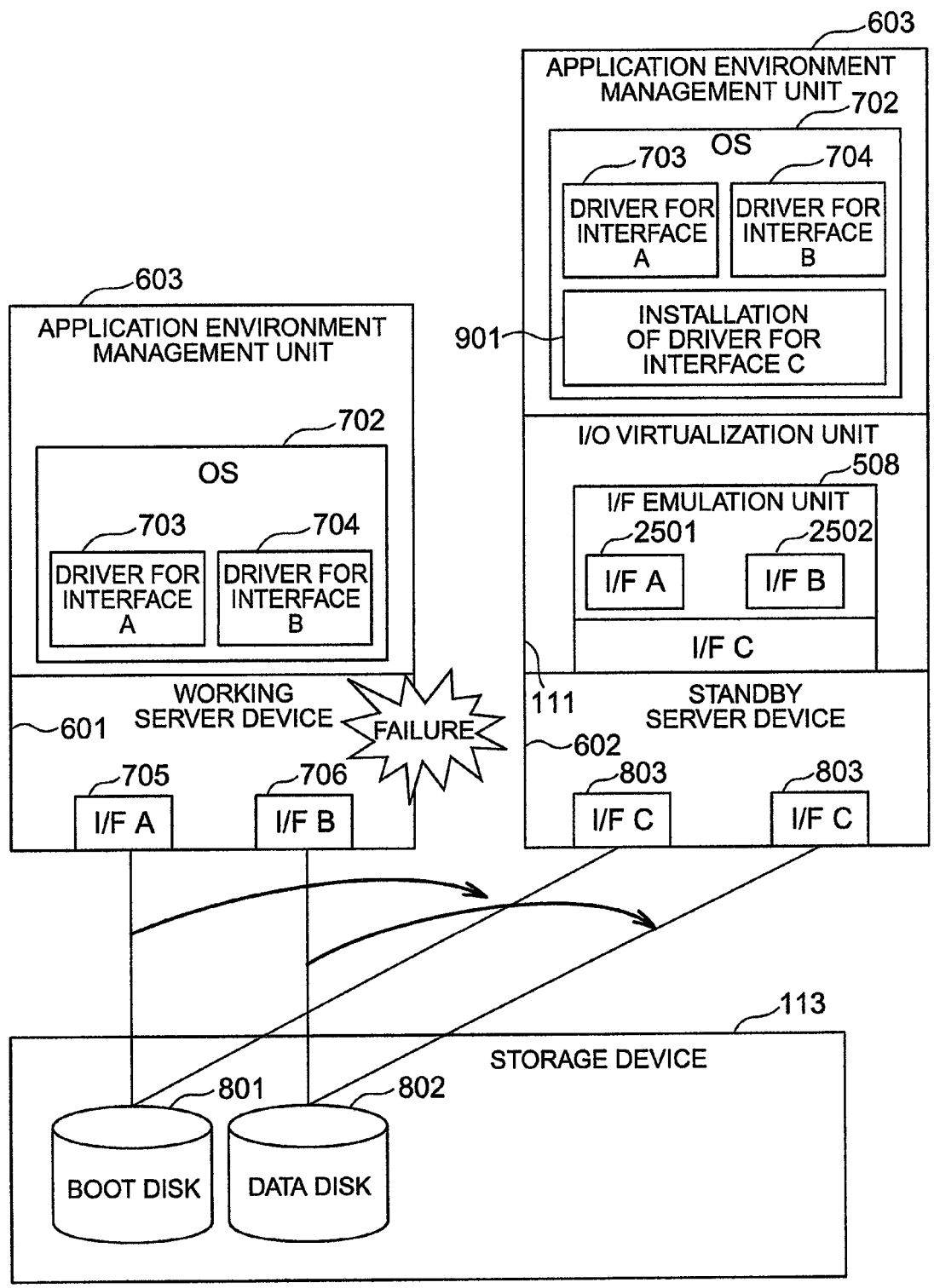
FIG. 25 shows a second embodiment of this invention wherein a failover operation is performed.

FIG. 25 shows a second embodiment of this invention wherein it is described that the initial configuration is unnecessary. As shown in FIG. 25, the interfaces of the working server device 601 are different in type from those of the standby server device 602. This embodiment corresponds to the case where the OS 702 is started up by the standby server device 602 without the initial configuration. I/F A 2501 and I/F B 2502 are I/F s emulated by the I/O virtualization unit 111.

Figure 26:
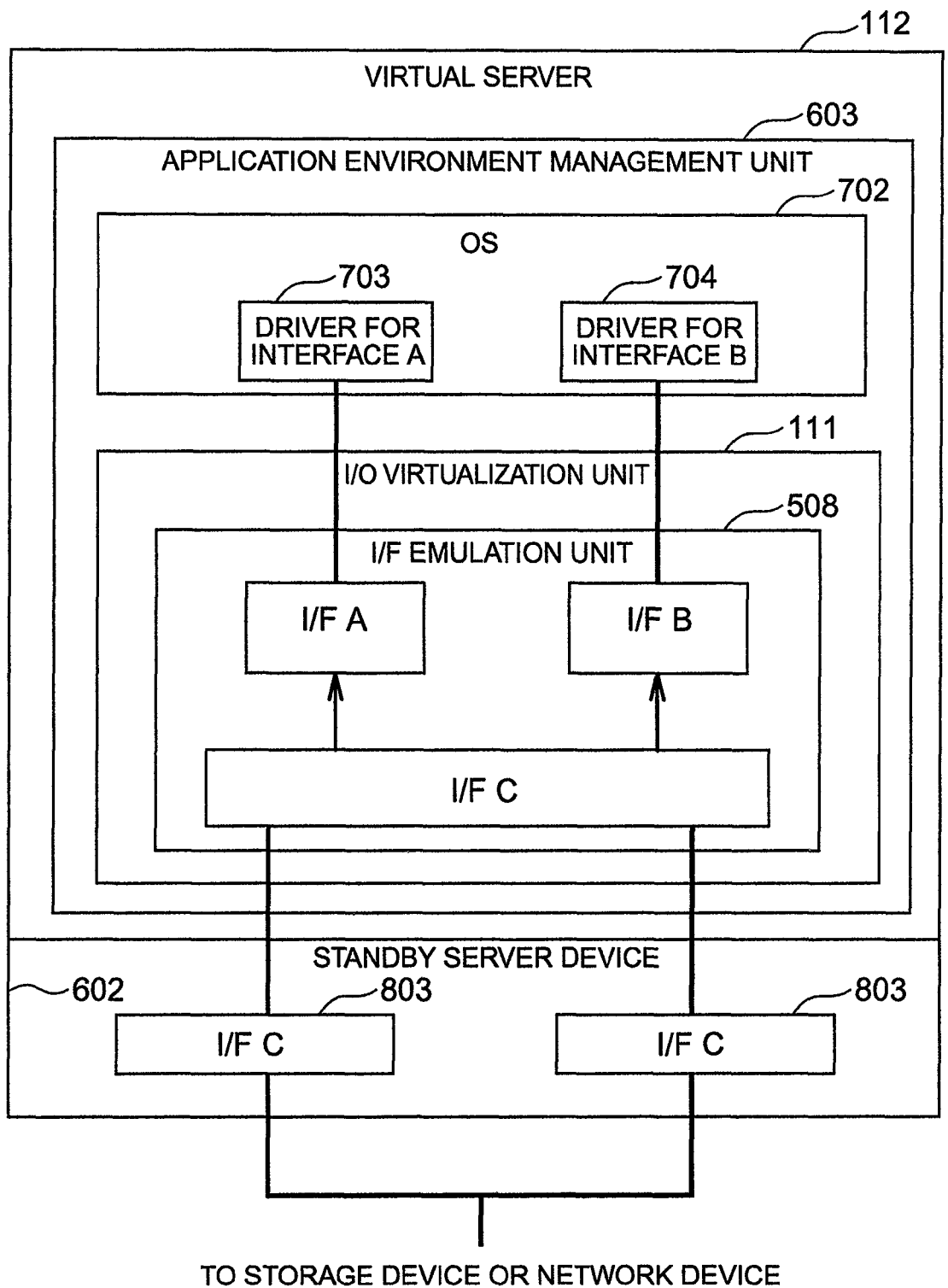
FIG. 26 shows a second embodiment of a virtual server included in the server device shown in FIG. 1.

FIG. 26 shows a second embodiment of the virtual server 112 included in the server device 109 shown in FIG. 1. FIG. 26 illustrates the case where the OS 702 is started up by the standby server device 602. When the I/Fs of the working server device 601 are different in type from those of the standby server device 602, the standby server device 602, which is to replace the working server device 601, boots up the I/O virtualization unit 111. The I/O virtualization unit 111 changes I/F C into I/F A 2501 and I/F B 2502 through the emulation of I/F A and I/F B. For example, the I/F emulation unit 508 can emulate the functions of the I/F A 2501 and the I/F B 2502 by previously registering in the I/F emulation unit 508 the identifiers of I/Fs and the behaviors of the control registers issued by the OS 702 corresponding to the identifiers of the I/Fs and then by matching the identifier of the I/F to be emulated, with the corresponding control register behavior.

The input to and output from the I/F Cs are converted to the input to and output from the I/F A 2501 and the I/F B 2502. In this embodiment, the functions of I/F Cs may be replaced collectively by the function of the I/F A 2501 or the I/F B 2502 in addition to the above case where the functions of I/F Cs were replaced separately by the functions of the I/F A 2501 and the I/F B 2502.

The OS 702 starts up by using the drivers for the I/F A 2501 and the I/F B 2502, both emulated. Then, the driver for the I/F C is installed in the OS 702. When the I/O virtualization unit 111 is removed, the OS 702 is started up due to the help of the driver for the I/F C. By emulating the I/F adapted to the driver installed in the OS 702 by means of the I/O virtualization unit 111, the OS 702 can be started up by the standby server device 602 whose configuration is different from that of the working server device 601. Thus, even when the configuration is changed after the initial configuration has been completed, failover operation can be satisfactorily performed.

Figure 27:
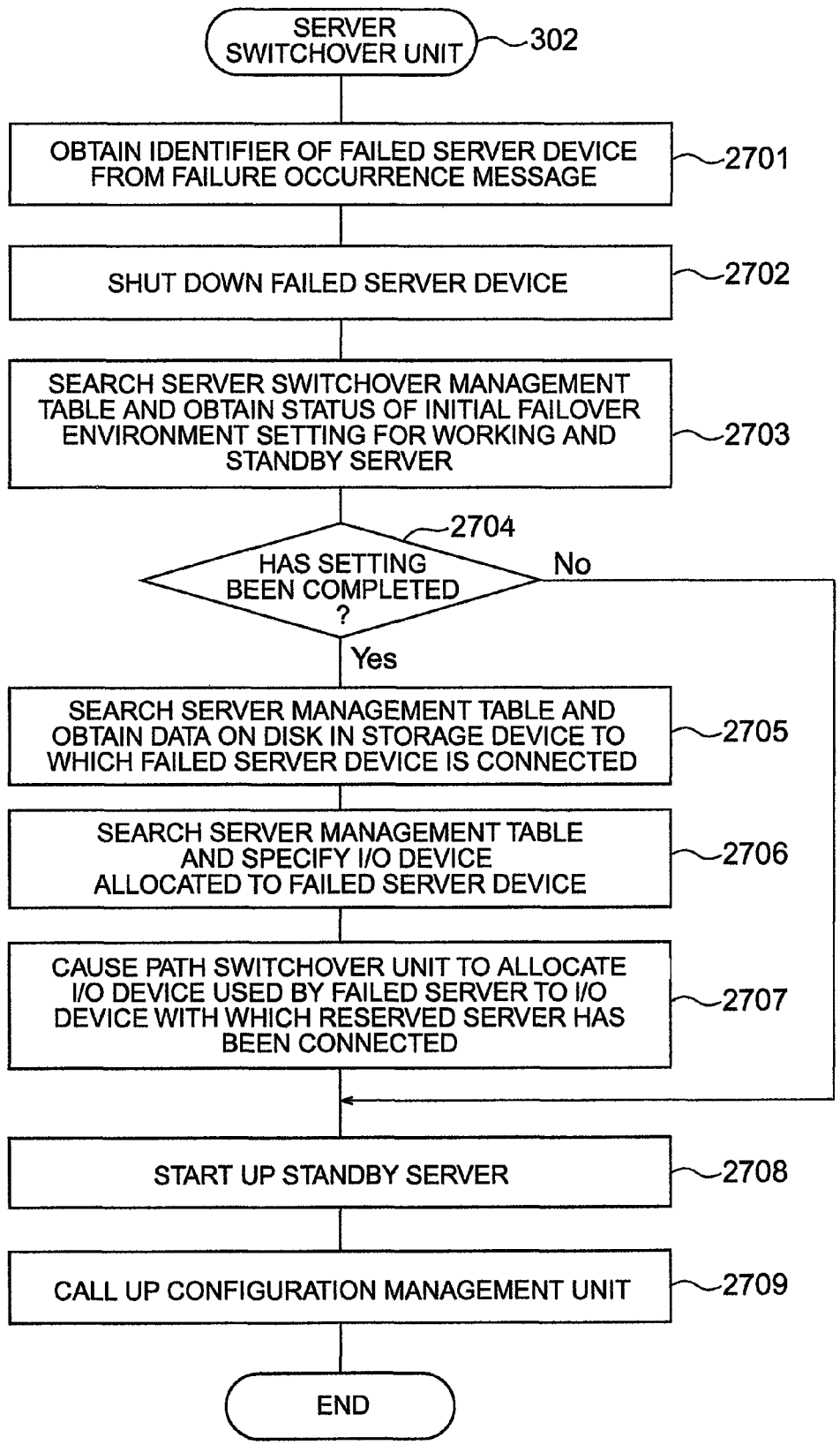
FIG. 27 is a flow chart for the operation of a server switchover unit used in the second embodiment of this invention.

FIG. 27 is a flow chart for the operation of the server switchover unit 302 used in this second embodiment of the present invention. Steps 2701~2708 are similar in function to the steps 1601~1608 in FIG. 16, respectively. In Step 2709, the standby server device 602 is started up, the configuration management unit 401 is then called up, and the I/O virtualization unit 111 is booted up in the standby server device 602. At this time, the OS 702 can be started up in the standby server device 602 regardless of the setting of initial configuration. Further, if the configuration of the standby server remains unchanged since the initial configuration thereof, the standby server device can take over the working server device in accordance with the original failover operation.

In this second embodiment of the invention is described a procedure wherein at the time of a working server device 601 failing, an arbitrary one of standby server devices 602 is chosen and the installation of driver is performed if necessary. There is another procedure possible wherein a particular standby server device 602 for which the driver installation is unnecessary is chosen instead of choosing an arbitrary one of standby server devices 602. According to this procedure, for example, the configuration management table 104 is searched with respect to the standby server devices 602 to replace the failed working server device 601 listed in the column 1402 of the server switchover management table 107, and choice is made of that standby server device 602 which is most similar in configuration to the failed working server device 601.

For example, to choose the most similar standby server device 602 means to choose that standby server device 602 which has an I/F as similar as possible to the I/F that failed working server device 601 has.

There is still another procedure wherein the standby server device 602 is chosen which has an I/F of the type as similar as possible to the type of the I/F that the failed working server device 601 has. If there is poor similarity in type between the I/Fs of the working server devices 601 and the I/Fs of the standby server devices 602, unnecessary drivers may be installed so that excessive time is consumed for driver installation. In addition, the installation of unnecessary drivers adversely affects the operating stability of the system. This procedure can eliminate such adverse effects as the excessive time consumption and the system instability.

There is proposed yet another procedure wherein the method of installing drivers can be varied depending on whether the I/F for which driver installation is required is for the boot disk 801 or the data disk 802. For example, if the driver for that I/F connected with the boot disk 801 which is one of the I/Fs included in the standby server device 602, is already installed and ready to be started up, then the standby server device 602 may be first started up by using the installed driver without resort to the I/O virtualization unit, and then the other necessary drivers may be installed.

Whether the driver for the I/F connected with the boot disk 801 has been already installed, can be judged by checking whether the allocated disk listed in the column 1107 of the configuration management table 104 is the boot disk and whether or not the I/O device of the working server device 601 connected with the boot disk is the same in type, as seen in the sub-column 1105 of the configuration management table 104, as the I/O device of the standby server device 602 to be connected with the same boot disk.

There is proposed an additional procedure wherein server switchover is performed by choosing a standby server device to take over a failed working server device through searching for a bootable standby server devices 602 by the use of the boot disk 801. For example, this procedure can be realized by referring to the boot disk 801 connected with the failed working server device 601 and the I/F corresponding to the boot disk 801 in the allocated disk column 1107 and the I/O device type sub-column 1105, respectively, and then by choosing the standby server device 602 having the I/F whose type is the same as that found in the I/O device type sub-column 1105.

With these procedures described above, if the I/O virtualization unit 111 can be dispensed with, there is no need for starting up the I/O virtualization unit 111 so that the time required for configuration can further be reduced.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method for managing configuration data in a computer system, wherein:
   a management computer included in the computer system obtains first hardware configuration data of a first hardware configuration of a standby computer, from a mini-operating system initiated by the standby computer; compares the obtained first hardware configuration data with second hardware configuration data of a second hardware configuration of a working computer; and, if the second hardware configuration of the working computer is different from the first hardware configuration of the standby computer, sends out to an interface virtualization unit a command for emulating the hardware in the first hardware configuration of the standby computer that is different from the hardware in the second hardware configuration of the working computer, to virtually provide an interface;
   wherein the interface virtualization unit, after receiving the command, emulates the different hardware of the standby computer to virtually provide the working computer with the interface; and
   wherein the operating system of the working computer, after detecting the emulated hardware, installs therein the driver adapted to the emulated hardware.

2. A method as claimed in claim 1, wherein the working computer, after the installation of the driver therein, checks whether or not the emulated hardware can be used with the installed driver.

3. A method as claimed in claim 1, wherein the management computer relates the hardware of the standby computer to a storage device in which the operating system of the working computer is stored, the operating system having the driver installed therein; and the working computer starts up the standby computer by using the operating system stored in the storage device.

4. A method as claimed in claim 3, wherein the management computer establishes a suited combination of the hardware of the standby computer and the storage device upon detecting a failure occurring in the working computer.

5. A method as claimed in claim 1, wherein the management computer sends out to the standby computer a program for obtaining the first hardware configuration data, and obtains the first hardware configuration data of the standby computer by the help of the program.

6. A method as claimed in claim 1, wherein the management computer contains device management data which relates pieces of hardware to associated drivers, obtains the driver to the emulated hardware by referring to the device management data, and installs the obtained driver in the operating system.

7. A method as claimed in claim 1, wherein when there are plural pieces of the different hardware included in the standby computer, the working computer emulates the plural pieces of hardware; and the operating system of the working computer, after detecting the emulated plural pieces of hardware, installs therein the drivers adapted to the emulated plural pieces of hardware.

8. A computer system comprising a management computer and a working computer,
wherein the management computer comprises:
a processor;
a memory;
a configuration data fetching unit under control of the processor for obtaining first hardware configuration data of a first hardware configuration of a standby computer, from a mini-operating system initiated by the standby computer; a configuration comparison unit under control of the processor for comparing the obtained first hardware configuration data of the standby computer with second hardware configuration data of a second hardware configuration of the working computer, and an initialization unit under control of the processor for, if the first hardware configuration of the standby computer is different from the second hardware configuration of the working computer, sending out a command to an interface virtualization unit of the working computer for emulating the hardware in the first hardware configuration of the standby computer that is different from the hardware in the second hardware configuration of the working computer, to virtually provide an interface; and
wherein the working computer comprises:
the interface virtualization unit for emulating the different hardware of the standby computer to virtually provide the working computer with the interface, and an application environment management unit for managing an operating system for installing therein the driver adapted to the emulated hardware when detecting the emulated hardware.

9. A computer system as claimed in claim 8, wherein the application environment management unit in the working computer, after the installation of the driver, checks whether or not the emulated hardware can be used with the installed driver.

10. A computer system as claimed in claim 8, wherein the management computer includes a switchover unit for relating the hardware of the standby computer to a storage device storing the operating system of the working computer in which the driver is installed, and the working computer starts up the standby computer by using the operating system stored in the storage device.

11. A computer system as claimed in claim 10, wherein the switchover unit in the management computer establishes a suited combination of the hardware of the standby computer and the storage device when a failure occurring in the working computer is detected.

12. A computer system as claimed in claim 8, wherein the configuration data fetching unit in the management computer sends out a program for obtaining the first hardware configuration data to the standby computer, and obtains the first hardware configuration data of the standby computer by using the program.

13. A computer system as claimed in claim 8, wherein the management computer contains device management data which relates pieces of hardware to drivers adapted thereto, and the application environment management unit in the management computer obtains the driver to the emulated hardware on the basis of the device management data, to install the driver in the operating system.

14. A computer system as claimed in claim 8, wherein when there are plural pieces of the different hardware included in the standby computer, the interface virtualization unit of the working computer emulates the plural pieces of hardware; and the operating system of the working computer, after detecting the emulated plural pieces of hardware, installs therein the drivers adapted to the emulated plural pieces of hardware.

15. A management computer comprising:
a processor;
a memory;
a configuration data fetching unit under control of the processor for obtaining first hardware configuration data of a first hardware configuration of a standby computer from a mini-operating system initiated by the standby computer;
a configuration comparison unit under control of the processor for comparing the obtained first hardware configuration data of the standby computer with second configuration data of a second hardware configuration of a working computer; and
an initialization unit under control of the processor for, if the obtained first hardware configuration data of the standby computer is different from the second hardware configuration data of the working computer, sending out a demand to an interface virtualization unit of the working computer for emulating the hardware in the first hardware configuration of the standby computer that is different from the hardware in the second hardware configuration of the working computer, to cause the interface virtualization unit to virtually provide the working computer with an interface,
wherein the working computer includes
an application environment management unit for managing an operating system for installing therein the driver adapted to the emulated hardware when detecting the emulated hardware.

16. A management computer as claimed in claim 15, wherein the application environment management unit in the working computer, after the installation of the driver, checks whether or not the emulated hardware can be used with the installed driver.

17. A management computer as claimed in claim 15, wherein the management computer includes a switchover unit for relating the hardware of the standby computer to a storage device storing the operating system of the working computer in which the driver is installed, and the working computer starts up the standby computer by using the operating system stored in the storage device.

18. A management computer as claimed in claim 17, wherein the switchover unit in the management computer establishes a suited combination of the hardware of the standby computer and the storage device when a failure occurring in the working computer is detected.

19. A management computer as claimed in claim 15, wherein the configuration data fetching unit in the management computer sends out a program for obtaining the first hardware configuration data to the standby computer, and obtains the first hardware configuration data of the standby computer by using the program.

20. A management computer as claimed in claim 15, wherein the management computer contains device management data which relate pieces of hardware to drivers adapted thereto, and the application environment management unit in the management computer obtains the driver to the emulated hardware on the basis of the device management data, to install the driver in the operating system.

* * * * *